US007813911B2

(12) United States Patent
Triou, Jr. et al.

(10) Patent No.: US 7,813,911 B2

(45) Date of Patent: Oct. 12, 2010

(54) MODEL BASED TESTING LANGUAGE AND FRAMEWORK

(75) Inventors: Edward John Triou, Jr., Duvall, WA (US); Amol Janardan Kher, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 986 days.

(21) Appl. No.: 11/531,070

(22) Filed: Sep. 12, 2006

(65) Prior Publication Data

US 2008/0028364 A1 Jan. 31, 2008

Related U.S. Application Data

(60) Provisional application No. 60/820,781, filed on Jul. 29, 2006.

(51) Int. Cl.
*G06F 9/45* (2006.01)

(52) U.S. Cl. ......................... 703/22; 717/104; 717/127; 717/131

(58) Field of Classification Search ................... 703/22; 717/104, 124, 126, 127, 131
See application file for complete search history.

(56) References Cited

U.S. PATENT DOCUMENTS

| | | | | |
|---|---|---|---|---|
| 5,870,590 | A * | 2/1999 | Kita et al. | 716/4 |
| 5,950,004 | A | 9/1999 | Bearse et al. | |
| 6,038,378 | A * | 3/2000 | Kita et al. | 714/38 |
| 6,577,982 | B1 | 6/2003 | Erb | |
| 6,934,934 | B1 * | 8/2005 | Osborne et al. | 717/126 |
| 6,944,848 | B2 * | 9/2005 | Hartman et al. | 717/124 |
| 6,976,246 | B1 | 12/2005 | Rosaria et al. | |
| 6,993,747 | B1 * | 1/2006 | Friedman | 717/124 |
| 7,000,224 | B1 * | 2/2006 | Osborne et al. | 717/125 |
| 7,089,534 | B2 | 8/2006 | Hartman et al. | |
| 7,237,231 | B2 * | 6/2007 | Lambert | 717/127 |
| 7,363,616 | B2 * | 4/2008 | Kalyanaraman | 717/124 |
| 2003/0046613 | A1 | 3/2003 | Farchi et al. | |
| 2003/0196191 | A1 | 10/2003 | Hartman et al. | |
| 2005/0256665 | A1 | 11/2005 | Hartmann et al. | |
| 2006/0075305 | A1 | 4/2006 | Robinson et al. | |
| 2006/0085681 | A1 | 4/2006 | Feldstein et al. | |
| 2006/0101397 | A1 | 5/2006 | Mercer et al. | |

(Continued)

OTHER PUBLICATIONS

Tan et al., Model-Based Testing and Monitoring for Hybrid Embedded Systems, Proceedings of the 2004 IEEE Int. Conference on Information Reuse and Integration, Nov. 2004, pp. 487-492.*

(Continued)

*Primary Examiner*—Russell Frejd
(74) *Attorney, Agent, or Firm*—Turocy & Watson, LLP

(57) ABSTRACT

A model based testing framework is provided that can be incorporated into and used to supplement existing testing approaches. Via annotation of custom attributes and requirements, the framework provides the ability to author models in the same language as code (e.g., test code) that interacts with the model. Optionally, the model-based testing techniques are accessible and changeable at run-time so that tests and models that are executing can be dynamically altered. Optionally, weights (and other techniques) may be exerted on one or more portions of the model to influence the execution of the tests. The ability to execute the model-based testing techniques on some portions of test code, while running hand-crafted or custom test code on other portions, is also provided.

17 Claims, 28 Drawing Sheets

U.S. PATENT DOCUMENTS

2008/0263506 A1 * 10/2008 Broadfoot et al. ........... 717/104

OTHER PUBLICATIONS

Grieskamp et al., XRT—Exploring Runtime for .NET Architecture and Applications, Electronic Notes in Theoretical Computer Science, vol. 144, Iss. 3, Feb. 2006, pp. 3-26.*

Mike Barnett, Wolfgang Grieskamp, Lev Nachmanson, Wolfram Schulte, Nikolai Tillmann, and Margus Veanes: Model-Based Testing with AsmL.NET in 1st European Conference on Model-Driven Software Engineering , Dec. 2003 http://research.microsoft.com/users/schulte/Papers/ModelBasedTestingWithAsmL(agedis2003).pdf.

S.R. Dalal, A. Jain, N. Karunanithi, J.M. Leaton, C.M. Lott, G.C. Patton, and B.M. Horowitz, Model-based testing in practice. In Intl. Conf. Software Engineering, pp. 285-294, May 1999. http://aetgweb.argreenhouse.com/papers/1999-icse.pdf.

A. Bertolino, E. Marchetti and H. Muccini: Introducing a Reasonably Complete and Coherent Approach for Model-based Testing, In: Proc. ETAPS 2004 workshop on "Test and Analysis of Component Based Systems"(Tacos), Barcelona, Spain, Mar. 2004. http://www.henrymuccini.com/Research/2004/Tacos04/BertolinoEtAl_Tacos04_CR.pdf.

IK El-Far and JA Whittaker, "Model-Based Software Testing". Encyclopedia of Software Engineering (edited by JJ Marciniak). Wiley, 2001. [Farchi, 2002] http://geocities.com/model_based_testing/ModelBasedSoftwareTesting.pdf.

* cited by examiner

100

```
public class Connection
{
        public Connection()
{
        // constructs a new connection object
        }

        public string                   ConnectionString
{
        set;    // format: "server=localhost;user id=sa;password=foo$bar00"
        get;    // security: password is not visible if ever opened, unless reset
        }

        public void                     Open()
{
        // opens the connection
        // requires the connectionstring to be set
        }

public Command                  CreateCommand()
{
        // creates a command, requires the connection to be open
        // command is what is used to later execute queries
}

        public Transaction      BeginTransaction()
{
        // begins a transaction, requires the connection to be open
}

public void                     Close()
{
        // closes the connection
        }

        public void                     Dispose()
{
        // closes the connection, and clears the connection string
        }
};
```

```
using(SqlConnection conn = new SqlConnection())
{
        //generate (or obtain a valid connection string)
        string connectionstring = "server=foo;trusted_connection=true;

//Open the connection
conn.ConnectionString = connectionstring;
        conn.Open();

        //verify the connection is open (and connected to the right server)
        SqlCommand cmd = conn.CreateCommand();
        cmd.CommandText = "select @@server_name";
        object servername = cmd.ExecuteScalar())
        //etc...
}
```

FIG. 1B

```
Action SelectNextAction()
{
        _action = null;
        switch( _currentstate )
        {
                case State.Init:
                        _action= ChooseFrom( Action.Open );
                        break;

                case State.Open:
                        _action = ChooseFrom(
Action.SetStr,Action.GetStr,Action.Close,Action.Dispose );
                        break;

                case State.SetStr:
                        _nextAction = ChooseFrom( Action.GetStr,
Action.Close, Action.Dispose);
                        break;

                case State.GetStr:
                        _nextAction = ChooseFrom( Action.SetStr,
Action.Close, Action.Dispose);
                        break;

                case State.Close:
                        _nextAction = ChooseFrom( Action.Dispose,
Action.Open );
                        break;

                case State.Dispose:
                        _nextAction = ChooseFrom(Action.Dispose,
Action.Init );
                        break;
                default :
                        break;
        }

        //Return the action randomly selected.
        return _action;
}

void Run ()
{
while( _nextAction != null )
{
                Execute (_nextAction);
                _nextAction = SetNextAction();
}
}
```

```
[Model]
public class Connection: Model
{
}
```

```
[ModelVariable]
private Opened          _opened = Opened.No;
```

```
[ModelAction]
public void Create()
{
        //method body.
}
```

FIG. 6C 630 632 632a 634 636

```
[ModelAction(Weight = 10)]
[ModelRequirement(Opened.No)]
[ModelRequirement(Not=ConnectionString.None)]
public virtual void             Open()
{
        //TODO: product call
        //TODO: verification
        //State affected
        _opened                        = Opened.Yes;
        _showpassword              = ShowPassword.No;
}
```

FIG. 6D 640 642 644 646

```
[ModelAction(Weight = 5)]
[ModelRequirement(Opened.No)]
[ModelParameter(Values = new object[]{ConnectionString.SA})]
public virtual void             SetConnectionString(ConnectionString connectionstring)
{
        //TODO: product call
        //TODO: verification

        //State affected
        _connectionstring       = connectionstring;
        _showpassword               = ShowPassword.Yes;
}
```

```
[Model]-------702
public class ConnectionModel : Model
{
        public enum ShowPassword
        {
                Yes,
                No
        };

        public enum Opened
        {
                Yes,
                No
        };

        [Flags] -------704
        public enum ConnectionString
        {
                None,
                SA,
                //etc...
        };

        //Variables
706a----[ModelVariable] public ShowPassword        _showpassword   = ShowPassword.Yes;
706b----[ModelVariable] public Opened              _opened         = Opened.No;
706c----[ModelVariable] public ConnectionString    _connectionstring= ConnectionString.None;

708a---- [ModelAction(CallFirst=true)]
        public virtual void          Create()
        {
                //TODO: product call
                //TODO: verification
                //State affected
        }

        [ModelAction]-------708b
        public virtual void          Close()
        {
                //TODO: product call
                //TODO: verification
                //State affected
                _opened                  = Opened.No;
        }

        [ModelAction]-------708c
        public virtual void          Dispose()
        {
                //TODO: product call
                //TODO: verification
                //State affected
                _opened                  = Opened.No;
                _connectionstring        = ConnectionString.None;
        }
```

FIG. 7A (Continues on Fig. 7B)

(Continued from Fig. 7A)

700b

```
[ModelAction(Weight= 10)] 708d
[ModelRequirement(Opened.No)] 710a
[ModelRequirement(Not=ConnectionString.None)] 710b
public virtual void          Open()
{
        //TODO: product call
        //TODO: verification
        //State affected
        _opened                          = Opened.Yes;
        _showpassword          = ShowPassword.No;
}

[ModelAction(Weight = 5)] 708e
[ModelRequirement(Opened.No)] 710c
[ModelParameter(Values = new object[]{ConnectionString.SA})] 712
public virtual void          SetConnectionString(ConnectionString connectionstring)
{
        //TODO: product call
        //TODO: verification
        //State affected
        _connectionstring      = connectionstring;
        _showpassword          = ShowPassword.Yes;
}

[ModelAction] 708f
public virtual string     GetConnectionString()
{
        //TODO: product call
        //TODO: verification
        //State affected (none)
        return null;
}

[ModelAction] 708g
[ModelRequirement(Opened.Yes)] 710d
public virtual Model     CreateCommand()
{
        //TODO: product call
        //TODO: verification
        //State affected
        return null;
}
}
```

```
[Variation("Test Open")]
public int Variation_1()
{
        Connection conn = new Connection();
        conn.Init();
        conn.SetConnectionString("SA");
        conn.Open();
        Verify( conn );
}
```

```
[Variation("Test Open")]
public int Variation_1()
{
        ConnectionModel conn = new ConnectionModel();
        ModelEngine e = new ModelEngine( conn );
        e.RunUntil( Opened.Yes );
Verify(conn.Connection);
}
```

FIG. 8B

```
[Model]
public class ConnectionStringModel : Model
{
        //Data
        StringBuilder _buffer = new StringBuilder();

        //Variables
        [ModelVariable] public string     _connectionstring;
        [ModelVariable] string                  _server;
        [ModelVariable] string                  _userid;
        [ModelVariable] string                  _password;
        [ModelVariable] string                  _integratedsecurity;
        [ModelVariable] string                  _network;

        //Actions
        [ModelAction]
        [ModelParameter("(localhost)")]
        public void             AddServer(string value)
        {
                //State affected
                _server = value;

                //Operation
                _buffer.Append("server=" + value + ";");
        }

        [ModelAction]
        [ModelParameter(Value="sa")]
        public void             AddUserId(string value)
        {
                //State affected
                _userid = value;

                //Operation
                _buffer.Append("user id=" + value + ";");
        }

        [ModelAction]
        [ModelParameter(Value="foo$bar00")]
        [ModelRequirement(Variable="_integratedsecurity", Value=ModelConstants.Null)]
        public void             AddPassword(string value)
        {
                //State affected
                _password = value;

                //Operation
                _buffer.Append("password=" + value + ";");
        }
```

900a

FIG. 9A (Continues on Fig. 9B)

(Continued from Fig. 9A)

900b

```
[ModelAction]
[ModelParameter("True", "False", "SSPI")]
[ModelRequirement(Variable="_userid", Value=ModelConstants.Null)]
[ModelRequirement(Variable="_password", Value=ModelConstants.Null)]
public void            AddIntegratedSecurityValue(string value)
{
        //State affected
        _integratedsecurity = value;

        //Operation
        _buffer.Append("integrated security=" + value + ";");
}

[ModelAction]
[ModelParameter(Values=new object[]{"dbnmpntw", "dbmsrpcn", "dbmssocn"})]
public void            AddNetwork(string value)
{
        //State affected
        _network = value;

        //Operation
        _buffer.Append("network=" + value + ";");
}

[ModelVariable]
public bool            IfUserIdEnsurePwd
{
        //Both UserID and Pwd are required (if either are specified)
        //Slightly more complex expression, so an expression is used (ie: code)
        get
        {
                return (_userid == null && _password == null) ||
                                (_userid != null && _password != null);
        }
        set
        {
        }
}

[ModelAction]
//Server always required
[ModelRequirement(Variable="_server", Not=ModelConstants.Null)]
//More complex verification
[ModelRequirement(Variable="IfUserIdEnsurePwd", Value=true)]
public void            Generate()
{
        //State affected
        _connectionstring = _buffer.ToString();
        Console.WriteLine(_connectionstring);

        //e.g., stop the model
        this.Disabled = true;
}
}
```

```
ConnectionModel model = new ConnectionModel();
model.Actions.FindExcept("Init", "SetString", "Close").Weight=0;
ModelEngine me = new ModelEngine( model );
me.Run();
```

```
ConnectionModel conn = new ConnectionModel();
ModelEngine e = new ModelEngine( conn );
e.RunUntil( Opened.Yes );
Verify(conn.Connection);
```

```
ConnectionStringModel conn = new ConnectionStringModel ();
ModelEngine e = new ModelEngine( conn );
CModelRequirements requirements = new CModelRequirements();
requirements.Add(e.Models[typeof(ConnectionStringModel)].Variables["_connectionstring"],
                                                            ConnectionString.SA);
e.RunUntil( requirements );
//Now I can open myself and verify.
conn.Open();
Verify( conn.Connection );
```

```
ConnectionModel cModel = new ConnectionModel();
ModelEngine me = new ModelEngine(cModel);
me.Seed = 12345; // seed value which generated the bug.
me.Run();
```

```
ConnectionModel cModel = new ConnectionModel();
ModelEngine me = new ModelEngine(cModel);
Me.TimeOut = 30000;//default is 30 seconds.
me.Run();
```

```
ConnectionStringModel conn = new
ConnectionStringModel ();
ModelEngine e = new ModelEngine( conn );
//With this seed, I know 11 action fails.
e.Seed = 12345;
e.MaxActions = 10;
e.Run();
//This is the state where if 11th action is called it fails.
//Now call other code or reset the seed.
```

```
ConnectionModel conn = new ConnectionModel();
ModelEngine e = new ModelEngine( conn );
e.WeighingScheme = WeighingScheme.Custom;
e.Run();
```

```
ConnectionModel model = new ConnectionModel();
model.Actions.FindExcept("Init", "SetString", "Close").Weight=0;
ModelEngine me = new ModelEngine( model );
ModelActions mActions = model.Actions.Find("SetString", "GetString", "Open");

while ( !mActions.Accessed )
me.Run();
```

```
ConnectionModel model = new
ConnectionModel();
ModelEngine me = new ModelEngine( model );
Me.VariableTracking = true;
Me.Run();
```

```
[ModelAction]
public virtual void     SetConnectionString()
{
        //TODO: product call
        //TODO: verification
        //State affected
        ConnectionStringModel stringModel = new ConnectionStringModel();
        ModelEngine me = new ModelEngine(stringModel);
        me.Run();
        _connectionstring      = stringModel.connectionstring;
        _showpassword               = ShowPassword.Yes;
}
```

```
[Model]
public class BaseModel : CModel
{
        //Some code
        [ModelAction]
        public void Method()
        {
        }
}
```

```
[Model]
public class ExtendedModel : BaseModel
{
        //Some code
        [ModelAction]
        public void NewMethod()
        {
        }
}
```

```
[Model]
public class LightSwitchModel : Model
{
        LightSwitchImplementation impl = null;

        [ModelVariable]
        public SwitchState State = SwitchState.Off;

        public override void Init()
        {
                if (IsExecuting)
                {
                        impl = new LightSwitchImplementation();
                }
        }

        [ModelAction]
        [ModelRequirement(Variable = "State", Value = SwitchState.Off)]
        public void TurnOn()
        {
                State = SwitchState.On;

                if (IsExecuting)
                {
                        impl.TurnOn();

                        if (State != impl.State)
                                throw new ApplicationException("should equal observed state");
                }
        }

        [ModelAction]
        [ModelRequirement(Variable = "State", Value = SwitchState.On)]
        public void TurnOff()
        {
                State = SwitchState.Off;

                if (IsExecuting)
                {
                        impl.TurnOff();

                        if (State != impl.State)
                                throw new ApplicationException("should equal observed state");
                }
        }
```

●
● (Continues on Fig. 14B)
●

(Continued from Fig. 14A)

1410

```
[ModelAction(CallLimit = 1)]
        [ModelRequirement(Variable="State", Value = SwitchState.On)]
        public void TurnOnInvalid()
        {
            // no state change, invalid no-op

            if (IsExecuting)
            {
                try
                {
                    impl.TurnOn();
                    throw new ApplicationException("expected exception...");
                }
                catch (InvalidOperationException)
                { /* swallow expected exception */ }
            }
        }

        [ModelAction(CallLimit = 1)]
        [ModelRequirement(Variable = "State", Value = SwitchState.Off)]
        public void TurnOffInvalid()
        {
            // no state change, invalid no-op

            if (IsExecuting)
            {
                try
                {
                    impl.TurnOff();
                    throw new ApplicationException("expected exception...");
                }
                catch (InvalidOperationException)
                { /* swallow expected exception */ }
            }
        }
    }
```

FIG. 14B

```
static void Main(string[] args)
{
        Model m = new LightSwitchModel();
        ModelEngine e = new ModelEngine(m);
        ModelExplorer expl = new ModelExplorer(e);
        ModelGraphBuilder builder = new ModelGraphBuilder();
        expl.Explore(builder.ObserveAction, 300);
        ModelGraphNode startingState = builder.RootNode;
}
```
1500

FIG. 15A

```
static void Main(string[] args)
{
        Model m = new LightSwitchModel();
        ModelEngine e = new ModelEngine(m);
        ModelExplorer expl = new ModelExplorer(e);
        ModelGraphBuilder builder = new ModelGraphBuilder();
        expl.Explore(builder.ObserveAction, 300);
        ModelGraphNode startingState = builder.RootNode;
}
```
1510

FIG. 15B

MODEL BASED TESTING LANGUAGE AND FRAMEWORK

RELATED APPLICATIONS

This application claims the benefit of Provisional U.S. Patent Application Ser. No. 60/820,781, filed Jul. 29, 2006, entitled "MODEL BASED TESTING FRAMEWORK", the entirety of which is incorporated herein by reference.

TECHNICAL FIELD

The subject invention relates generally to testing computer programs and processes and more particularly, the invention relates to a test framework that efficiently implements model-based testing.

BACKGROUND

Traditionally, tests have been written and designed in a fairly hand-crafted manor. While some advantages have existed as a result, the scenarios themselves have remained somewhat fixed, i.e., although the data or input might vary (slightly), for the most part, the sequences of operations that are actually made on the product code, does not vary much.

A list of disadvantages for traditional 'hand-crafted' approach includes (1) Hand-crafted tests require a lot of code (to cover every scenario), (2) Hand-crafted tests are expensive to maintain (cleanup can last for years), (3) Hand-crafted test issues surpass product bugs found (e.g., as shown in verification data), (4) Hand-crafted tests have low coverage (generally only about 60%), (5) Hand-crafted tests are rigid (difficult to improve, change, or keep up with specification/developer changes), (6) Hand-crafted tests are static (running the same scenarios over and over, meanwhile missing bugs), (7) Hand-crafted tests include poor designs (everyone designs tests differently) and (8) Hand-crafted tests do not scale well (with increasing feature sets, complexity, and deliverables).

These disadvantages can be overwhelming in terms of the intense resources required for cleanup, maintenance, and improvements of tests. The ability for tests to find issues before customers do is also diminishing as systems become more complex, have more dependencies, and are used in unforeseeable scenarios. Accordingly, there is a need for a model-based test framework that addresses these and other deficiencies in the current state of software testing techniques.

SUMMARY

The invention provides model based testing techniques that can be incorporated into and used to supplement existing testing approaches. A testing framework is provided which allows testing requirements and attributes to be described in the code being tested, without mixing state machine code into the definition of the requirements. Accordingly, state machines can be separated from the requirements creating a more modular and individually controllable design.

In an exemplary, non-limiting embodiment, the framework of the invention provides the ability to author models in the same language as code (e.g., test code) that interacts with the model. Optionally, the model-based testing techniques are accessible and changeable at run-time so that models that are executing can be dynamically altered. Optionally, weights (and other techniques) may be exerted on one or more portions of the model to influence the execution of the tests. Still further, the invention includes the ability to execute the model-based testing techniques on some portions of test code, while running hand-crafted or custom test code on other portions.

A simplified summary is provided herein to help enable a basic or general understanding of various aspects of exemplary, non-limiting embodiments that follow in the more detailed description and the accompanying drawings. This summary is not intended, however, as an extensive or exhaustive overview. The sole purpose of this summary is to present some concepts related to the various exemplary non-limiting embodiments of the invention in a simplified form as a prelude to the more detailed description that follows.

BRIEF DESCRIPTION OF THE DRAWINGS

The system and methods for providing model based testing are further described with reference to the accompanying drawings in which:

FIGS. 1A and 1B illustrate exemplary modeling for different connection objects;

FIG. 3C illustrates an exemplary switch statement approach to modeling;

FIGS. 6A, 6B, 6C, 6D and 6E illustrate exemplary aspects of the custom attributes of the language of the invention;

FIGS. 7A and 7B represent pseudo-code that illustrates an exemplary use of the modeling language of the invention;

FIGS. 8A and 8B are exemplary test code snippets that show additional features of the invention;

FIGS. 9A and 9B represent pseudo-code that illustrates additional exemplary, non-limiting use of the modeling language of the invention;

FIGS. 11A, 11B, 11C, 11D, 11E, 11F, 11G, 11H, 11I and 11J are exemplary test code snippets that show various additional features of the test framework of the invention;

FIGS. 12A and 12B illustrate a distinction between base model code, and extended code, in accordance with a non-limiting code modification practice in accordance with the invention;

FIGS. 14A and 14B are exemplary test code snippets that show various additional features of the test framework of the invention;

FIGS. 15A and 15B represent pseudo-code that illustrates an exemplary use of the modeling language of the invention for a light switch example;

DETAILED DESCRIPTION

Figure 2A:
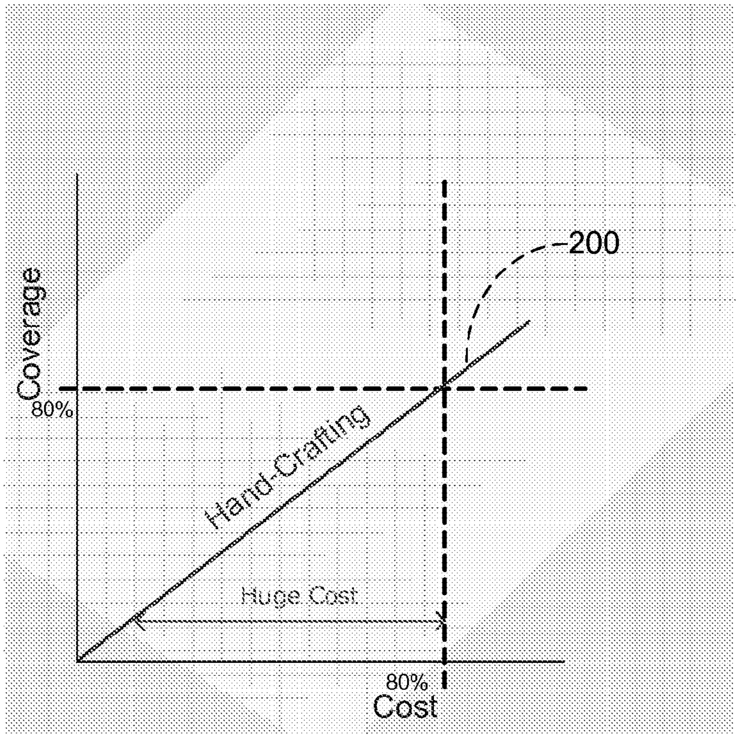
FIGS. 2A and 2B are exemplary performance curves comparing model based testing and hand-crafted approaches to testing.

As discussed in the background, current hand-crafted testing techniques have significant downsides. The invention thus introduces model based testing techniques including tools and a language that can be seamlessly integrated with existing testing approaches. The invention makes modeling simple to achieve even on a small scale, and the language defined in accordance with the invention fits well with existing testing approaches. Additional description and detail regarding various exemplary, non-limiting embodiments of the testing framework of the invention follow the introductory sections below, which describe why model based testing is beneficial from a comparative standpoint, and some of the limitations of model-based approaches based on "switch" programming statements.

Overview of Benefits of Model Based Testing

Beginning with a relatively simple example for conceptual consideration, a 'database connection' may be considered as a first representative testing example. In FIG. 1A, exemplary pseudo-code 100 defines the database connection as a 'Connection' class. The database connection has a few set of methods, i.e., Open( ), CreateCommand( ), Close( ), etc., with some order, i.e., state, between them, and some input data that is required. For instance, the methods specify that the ConnectionString is set, opened and verified.

At first glance, due to the conceptual simplicity just outlined, testing the connection seems like a correspondingly simple matter; however, one of skill in the art can appreciate that the problem is a lot more complex than it appears from a test standpoint. The following description shows why hand-crafted solutions, despite their use of code sharing, are not adequate to address today's testing needs as efficiently as model-based solutions provided in the various embodiments of the invention described further below.

FIG. 1B illustrates exemplary hand-crafted pseudo-code 110, i.e., a custom-code test skeleton of some test cases for the Connection class 100 of FIG. 1A. For illustrative purposes, pseudo-code 100 of FIG. 1B focuses on some individual parts of a hypothetical test plan for the database connection. In this regard, "opening the connection" and "verifying the connection is to the correct server" are used for illustrative test purposes in hand-crafted pseudo-code 110.

With hand-crafted test solutions, as more variations are written, more code can be shared. For instance, "connection string creation" could be moved into a function, and "verification that the connection is opened" could be moved to another function, etc. As the library of functions grow, code can be shared rather than wholesale re-written. For instance, if the next variation of pseudo-code 100 includes a feature to ensure the password was not visible (after open), another set of code (or helpers) may be used to ensure the specific verification. This creates an interdependency with the other set of code (or helpers). Thus, while code sharing can be beneficial when hand-crafting evolving test scenarios, the end result of code sharing is code with more interdependencies.

Also, these functions might be driven this with different data (connection strings, queries, etc), and componentized, however, a fairly static scenario still results, e.g., the ConnectionString is always going to be set, opened, and verified.

Some other test techniques for handling evolutions in code include the use of conditional code (along with data input) in between other operations. For example, a condition might be added after 'Open' that starts a transaction based upon some parameter passed in with the function call. While such conditional approaches leverage existing code, the sequences are still going to be either Open->Execute, or Open->BeginTransaction->Execute. While conditional code can be utilized to some success when good choices are made, the developer is nonetheless required to code both the sequences and the conditional code, which can significantly add to the complexity of testing, particularly if bad choices are made. In contrast, model-based testing approaches of the invention do not suffer from these drawbacks.

For another example, suppose changes are implemented for a specification, product, or even behavior for a software process. For simple changes, a developer may have "guessed right" and have factored the code fortuitously so that the changes are isolated with ease, which is the best case. However, a worse case might also realize and cause a total rethinking of the set of static scenarios.

Worse yet, if an entirely new feature is added to the product, e.g., a new method, a new interface, a new property, a new data type, etc., obtaining coverage of the new feature in test scenarios poses a significant problem for hand-crafted approaches. Testers generally take the path of least resistance by adding only the additional scenarios, as opposed to potentially re-organizing the scenarios according to a larger context, which additional scenarios are then tested in a limited context without testing the code as a whole. By merely adding the new scenarios, the developer avoids the path of rethinking all of the initial assumptions about the existing scenarios, but with each new addition, the complexity of the code might increase exponentially, making the test problem unmanageable. Such additions thus become very expensive to make when hand-crafted test solutions are adopted, and the benefits of an easily modifiable, model-based solution become even clearer.

A list of benefits for modeling approaches thus includes: (1) Rules are specified once (not sprinkled throughout test code), (2) Less Maintenance, (maintaining a single model, test issues centralized), (3) Fluid Design (improving the model improves all existing scenarios), (4) Design more, code less (think smarter, not code faster) and (5) High coverage—continuing to find bugs.

As mentioned above, when software design engineers in test (SDETs) begin a task, they tend to fail to consider modeling as part of the solution. In essence, it is believed that most testers think of modeling today as an expensive all-or-nothing approach that does not fit well with how they write tests today. Thus, SDETs either take the costly and challenging approach of modeling everything, such as an entire grammar and all of its nuances, or they model nothing.

With hand-crafted scenarios, it is unrealistic to try to cover everything, so there are cost vs. value tradeoffs built into existing hand crafted approaches. Modeling is similar in that there are costs, but the value vs. cost curve is drastically different. For traditional testing, the value vs. cost curve tends to approximate a linear (or even somewhat less than linear) curve, e.g., 70% completed generally produces at or less than 70% coverage.

FIG. 2A, for instance, shows a traditional testing curve 200 as linear, illustrating generally that an "ounce of effort" correspondingly produces about "an ounce of result." Thus, for instance, at the illustrative point on the curve 200 represented by the intersection of the dashed lines, it is observed that about 80% cost produces about 80% coverage. However, when attempting to cover every permutation and combination of possible paths that a complex software process might take, an exhaustive, sometimes prohibitive, amount of effort may be required to reach even a reasonable amount of path coverage.

Figure 2B:
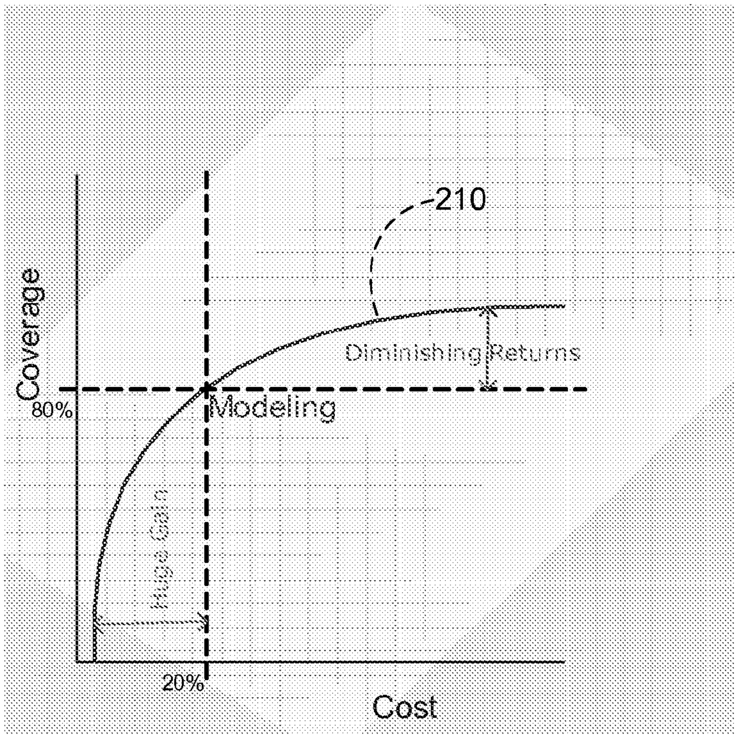

In contrast, modeling generally produces a more exponential cost v. value curve, as shown in the exemplary modeling cost v. coverage curve 210 of FIG. 2B. In this respect, modeling requires a higher up-front cost in design, i.e., the curve does not start at the origin. However, from that point on, once the initial modeling overhead is achieved, the cost of adding to the model is small in comparison to the larger value being obtained. As shown, reaching the 80% value obtained point may only take 20% cost.

However, the curve 210 also shows modeling can be expensive with marginal value once a threshold amount of coverage is obtained. Modeling every aspect of the system is challenging, and can be done, but at an extreme cost due to this marginal value return above the threshold. However, in accordance with the modeling language and framework of the invention, modeling can be achieved for smaller scales, e.g., portions of the overall code, with tremendous overall benefits.

For another instance, an exemplary scenario might be where there are three boolean variables, and ten possible states for a state machine. With ten states, then already more than a thousand combinations are possible ($2^{10}$). In testing, such situations are frequent and they end up being addressed with handcrafted solutions. With a handcrafted solution, however, it is not easy to ensure that all the possible states are covered. Yet, even a simple state machine can solve some of these issues.

Thus, today's test approaches tend to be hand-crafted solutions and are not designed in a way to fully exploit the power of modeling computer behavior and processes. In consideration of the deficiencies of the hand-crafted testing approaches taken in the past, the testing framework and language of the invention provide an experience that enables hands-on, exploratory testing to become familiar with an application. Then, using the knowledge gained during the hands-on testing, the invention enables the creation of one or more behavioral models for an application. A test program can then be used to test the application's behavior against what the model(s) predicted. Since the behavioral model(s) are simpler than the application under test, the model(s) are easy to create. Since the test program knows what the application is supposed to do according to the modeled behavior, the test program detects when the application is doing the wrong thing (a bug).

Another aspect of the invention applies to the ability of the model-based testing framework to adapt as a product cycle progresses. For instance, the testing framework of the invention enables developers to write new features for an application and quickly update the model, so that the tests can continue to run. The program can run day and night, constantly generating new test sequences. The tests can be run on a dozen machines at once and several days of testing can be achieved in a single night, converging on a small number of bugs quickly. Models created according to the language defined in accordance with the model-based testing framework of the invention can thus be upgraded to test for additional behaviors and further testing on the fly. The invention also advantageously enables hands-on testing and static automation to be performed for those parts of an application that are not yet worth modeling.

Introduction To Model Based Testing

Modeling is thus a simple mechanism for defining the behavior of a computer system. Stated differently, a model is a simple set of rules that determine which parts of the system can be called. With those rules, an engine can generate combinations that adhere, or do not adhere, to the model.

Figure 3A:
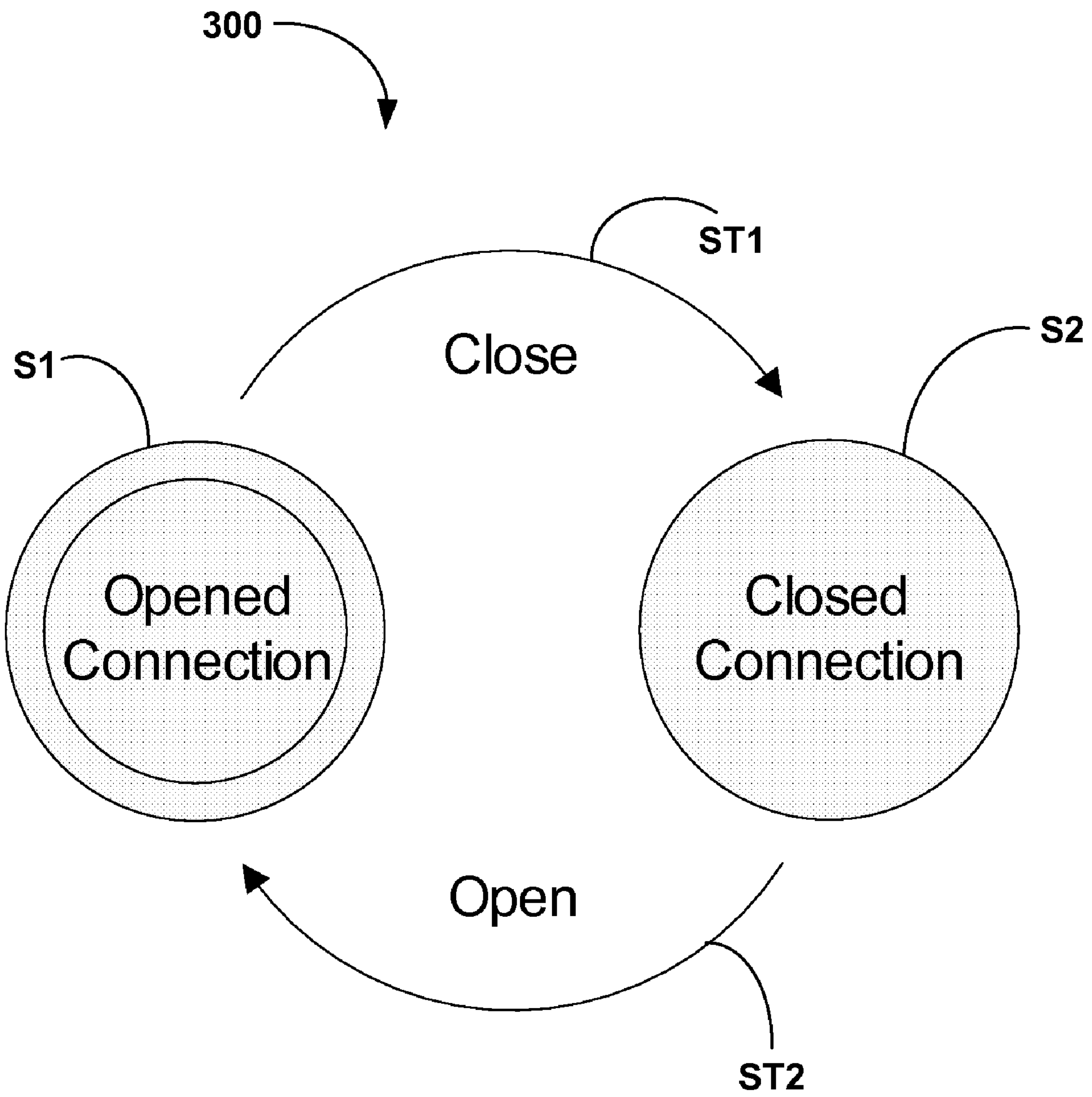
FIGS. 3A and 3B are exemplary state machines modeling Connection operations.

A model can be represented pictorially as a state machine. In a state machine, such as the example state machine 300 of FIG. 3A, each state (circle) represents a unique behavior of the system, which then defines transitions (arcs) to other states, by some associated actions. State machine 300 is a simplistic model of the connection object example referred to above, having state S1 (opened connection) and state S2 (closed connection) and state transitions ST1 and ST2 for transitioning between the states S1 and S2.

Designing a state machine, such as state machine 300, is typically what is done when test plans are written today, or when hand-craft scenarios are formulated, though done at a considerably more complex level than merely two states and two state transitions. For each scenario, the specification is interpreted, and then those rules are used to craft either a positive or negative scenario. While state machine 300 is simplified, one can appreciate that a significant amount of time could be spent writing endless (and very similar) scenarios to cover a set of rules and all of the permutations and combinations of those rules. As the complexity and interdependencies of today's software continue to mount, today's hand-crafted approaches are outmoded and inefficient for a vast class of test problems.

Instead, some model-based approaches let a machine traverse through the valid (and invalid) combinations and permutations based upon the rules of a model defined for an application. A machine can do a better job at traversing rules than people, which means, in terms of coverage and permutations, a majority of the mundane scenarios will be achieved with a well designed model. This frees SDETs to spend more time in understanding and questioning the rules, and frees up more time to focus on the more difficult user scenarios that are not easily achieved through a model. These latter test problems tend to better performed by humans than computers, and thus the division of labor between man and machine is more appropriate with the test framework of the invention.

Figure 3B:
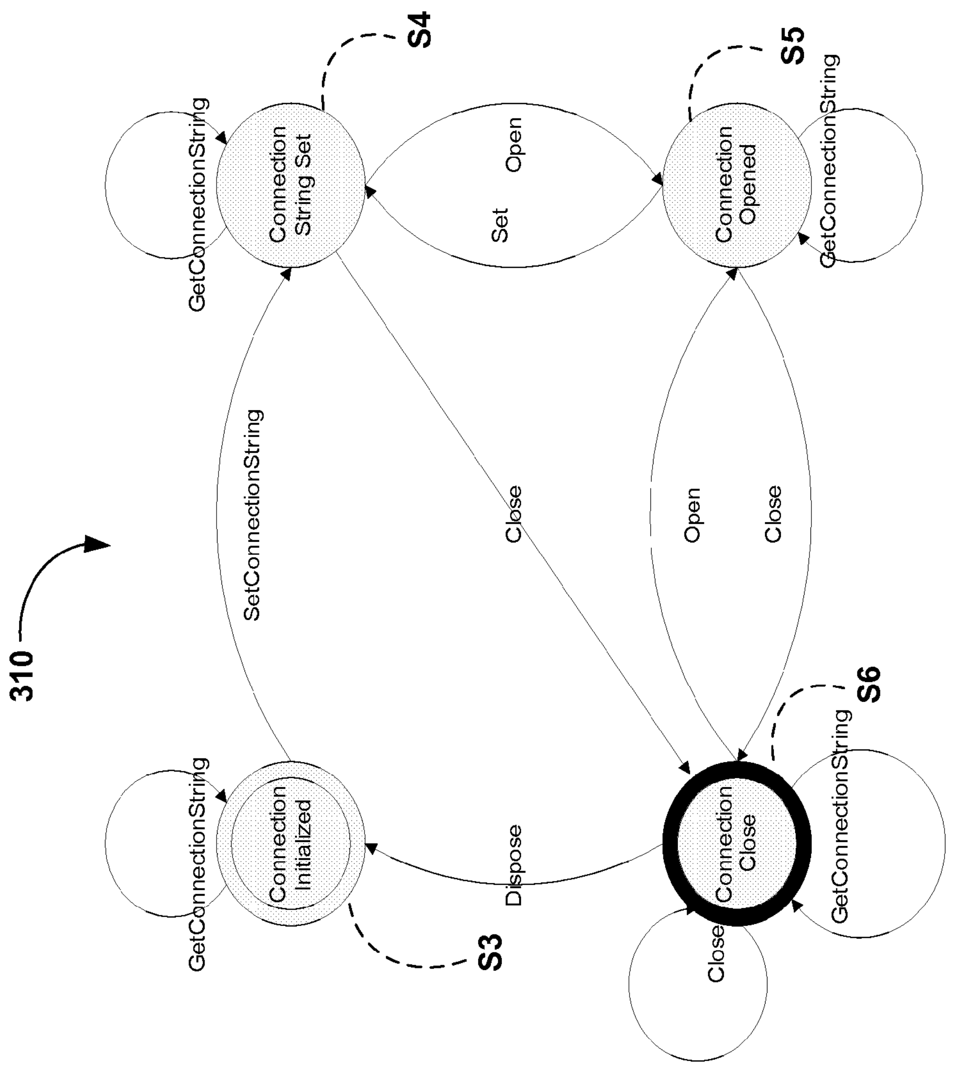

An Ado.Net SQL Connection object is an object used to connect to a target SQL server and is a more complex example of a Connection object. To model the SQL connection object, the behaviors of the methods must be defined. The methods from the SQL Connection object class include Open, SetConnectionString, GetConnectionString, Close and Dispose. With these methods, the resulting state diagram 310 is shown in FIG. 3B, having states S3, S4, S5, and S6 for "connection initialized," "connection string set," "connection opened" and "connection closed" states, respectively, and various transitions for transitioning among states S3, S4, S5, and S6. Thus, given the connection class for the SQL connection object, for instance, a switch statement, such as switch statement 320 of FIG. 3C, can be written that randomly selects the next method to call on the connection. The result is a state machine, such as state diagram 310, based on successive states and state transitions.

Thus, based on a switch statement, such as switch statement 320 of FIG. 3C, a state diagram can be created, such as state diagram 310 of FIG. 3B. Exemplary non-limiting benefits of the switch statement approach include, but are not limited to: (1) Models are straightforward to generate, (2) One can enable or disable certain methods as part of a test (e.g., in the ChooseFrom portion of switch statement 140) and (3) Modeling allows exploratory/penetration testing.

However, drawbacks of model creation based on switch statements include: (1) Tracking states must be done by the testers and hence new states are added requiring SelectNextAction expressions to be updated every where, (2) No control over the machine means there are no coverage guarantees; not suitable for automation, (3) Model creation with switch statements is hard to integrate with existing tests. Each new model has its own duplicate code to manage, (4) There is no way to specify a requirement for an action; rather, the requirement becomes part of code itself and hence is hard to review when shown to someone, (5) This model is difficult to share with someone else since someone else cannot control or influence the model and (6) While all states can be explored using this simple modeling technique, there are still no guarantees.

Exemplary Embodiments of Testing Language and Framework

In consideration of the above-described deficiencies of early model-based approaches and hand-crafted testing solutions, in exemplary non-limiting embodiments, the invention provides model based testing techniques that can be incorporated into and used to supplement existing testing approaches. A testing framework is provided which allows testing requirements and attributes to be described in the code being tested, without mixing state machine code into the definition of the requirements. Accordingly, state machines can be separated from the requirements creating a more modular and individually controllable design.

In an exemplary, non-limiting embodiment, the framework of the invention provides the ability to author models in the same language as code (e.g., test code) that interacts with the model. Optionally, the model-based testing techniques are accessible and changeable at run-time so that tests and models that are executing can be dynamically altered. Optionally, weights (and other techniques) may be exerted on one or more portions of the model to influence the execution of the tests. Still further, the invention includes the ability to execute the model-based testing techniques on some portions of test code, while running hand-crafted or custom test code on other portions.

Thinking of a model as any class, a model (class) has its state and a model (class) has actions that work on the class and affect its state. In the actual system tested, this behavior and this state is implicit. This behavior is then understood by the tool and the state space can be explored. Thus, in any modeling framework, a way to express the behavior of the object is used, which is called the "language" and a way to understand that behavior and explore the model are used, which are generally referred to as the "engine."

Figure 4:
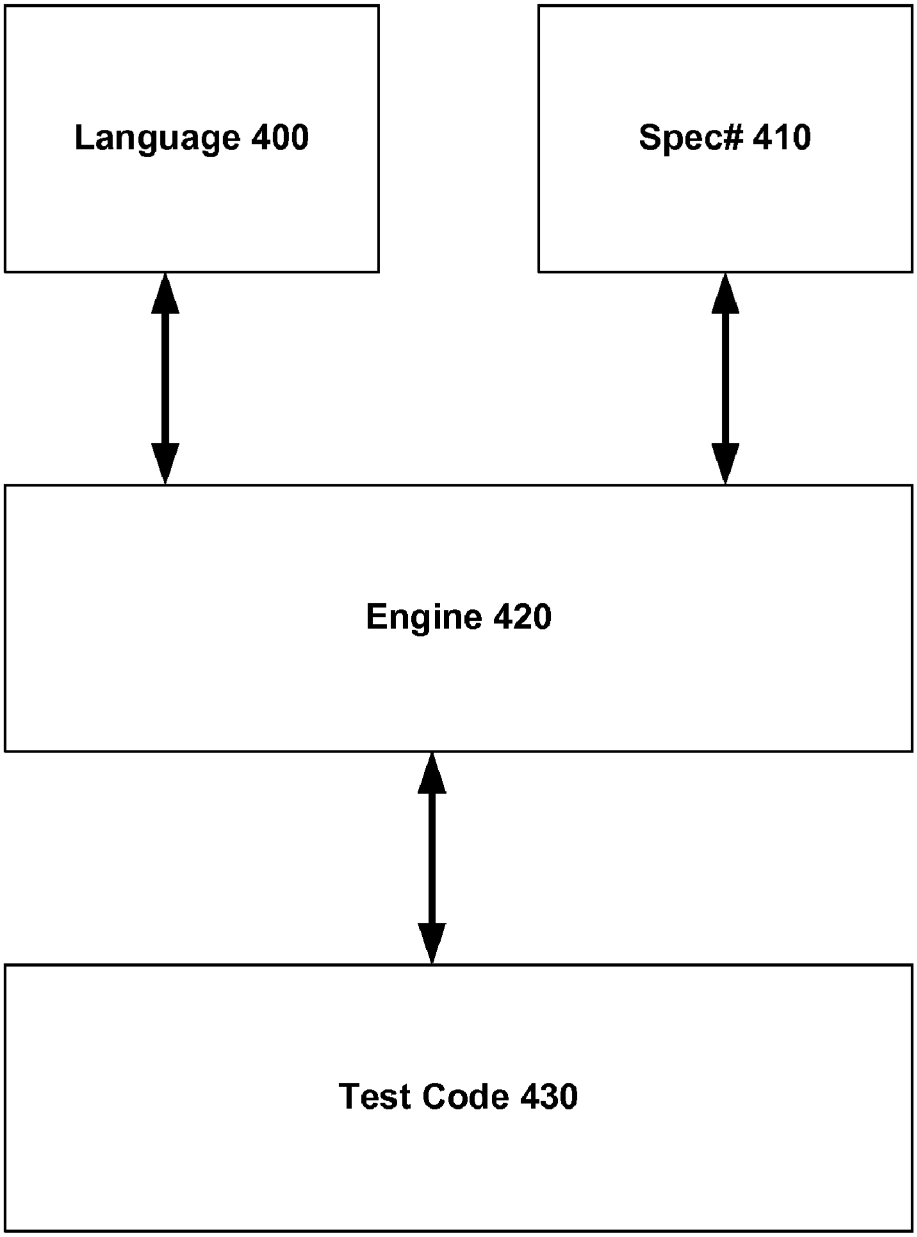
FIG. 4 is an exemplary, non-limiting architectural diagram of testing performed in accordance with the invention.

In a non-limiting embodiment, an implementation is provided that understands a C# style modeling language with custom attributes. This is extendable and advantageously, the tester no longer is required to change their tests on a large scale. The block diagram of FIG. 4 illustrates an exemplary non-limiting architecture for the invention in which language 400 and Spec# 410 are separate parts of a top layer, with engine 420 as a processing middle layer, and the test code 430 itself residing under the engine 420. Thus, it can be appreciated that the test code 430 is separated from the modeling language 400 by the abstraction layer provided by engine 420.

The testing engine 420 of the invention can also delegate tasks to the Spec# engine 410 to explore the model. As used herein, "language" or testing language 400 is utilized to mean pre-defined custom attributes used to describe the behavior of the system being modeled.

The language 400 of the invention includes a list of the features generally used to design a model, although it is recognized that other specific languages can be designed to achieve the same or similar design objectives. The list of features, for instance, may be selected based on experience with existing tools and techniques for creating models. In one embodiment of the language 400 of the invention, requirements are defined in the form of C# custom attributes. This language makes it easier to add model based testing (MBT) tests to an existing test bed and addresses the top concerns of incorporating modeling in day-to-day testing. As mentioned, one of the goals of the testing framework of the invention is to address the problems of the previous approach using switch statements.

Figure 5:
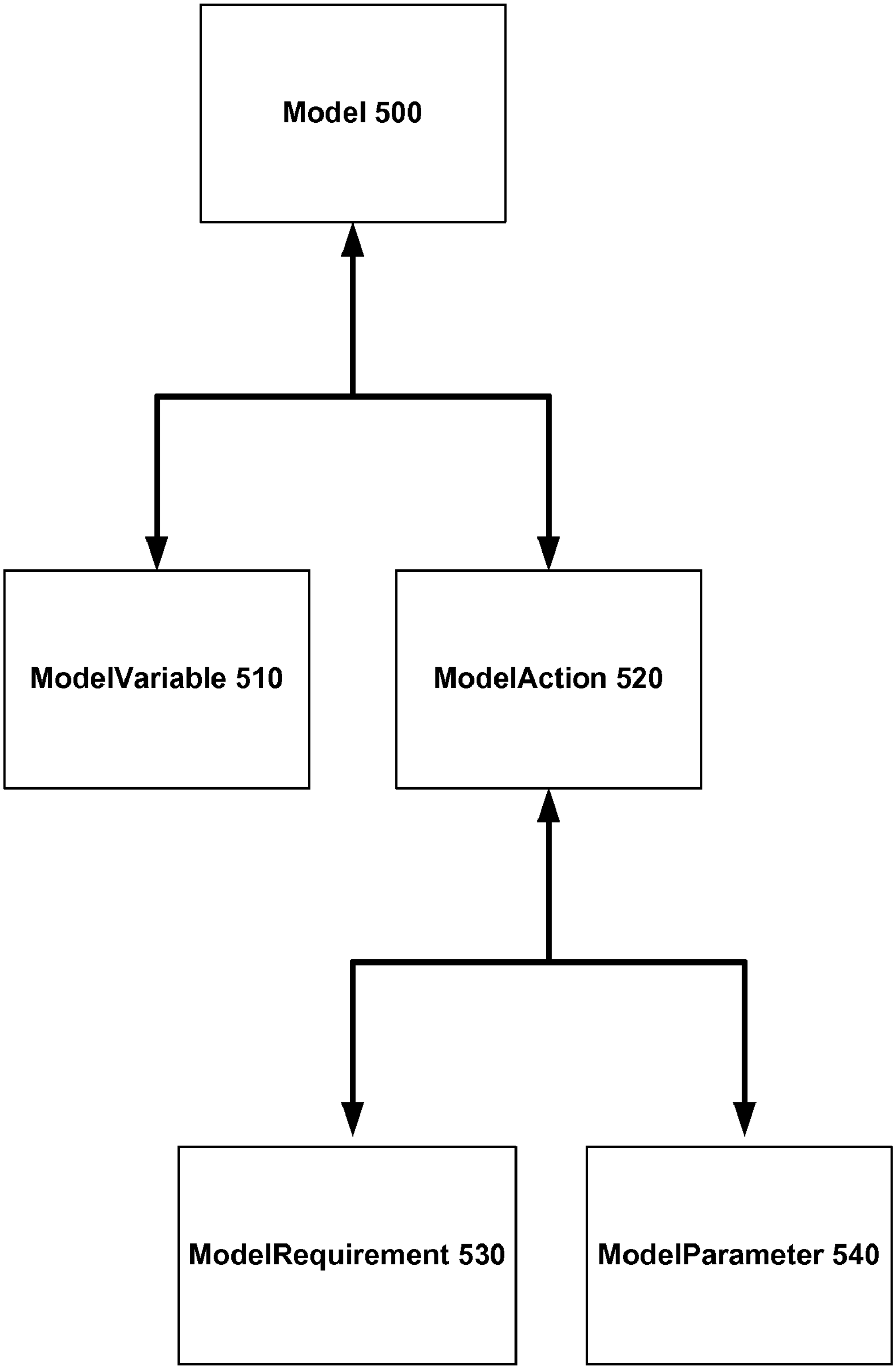
FIG. 5 is an exemplary, non-limiting block diagram of modeling attributes defined for the programming language in accordance with the invention.

In this section, features of the "language" 400 and how the language is used in different scenarios are shown in accordance with the invention. In testing, model requirements, states and methods are described in terms of custom attributes. These attributes annotate a member variable, a class or a method to expose that entity to the testing engine 420. The engine 420 takes a class which contains methods and variables with these custom attributes. It then uses reflection to load all the annotated members of the class, and based on the reflection, constructs the model to represent the class. The engine 420 can then choose an action to call on the model (based upon the rules) and subsequently explore the model. The object hierarchy of the invention shown in FIG. 5 introduces various exemplary non-limiting custom attributes used in the specification of language 400.

This object model includes a Model class 500 which includes one or many ModelVariables 510 and ModelActions 520. ModelActions 520 include one or many ModelRequirements 530 and ModelParameters 540. Each of these individual classes have additional properties defined on them to further describe them. All the classes inherit from a common base class ModelItem. More detail for these custom attribute classes is provided below.

In one non-limiting embodiment of the invention, to define a class as a model 500, the Model attribute is used. Exemplary use of the Model attribute is shown in FIG. 6A according to the bracketed expression 602 of pseudo-code 600. In one embodiment, the following properties of Table I are supported on the Model attribute in accordance with the language of the invention.

TABLE I

| Exemplary Properties Supported on Model Attribute | |
|---|---|
| Weight | The relative weight of this model against other models. The engine uses this weight as a factor when choosing actions between multiple models. |
| Disabled | To include or exclude this model in execution |
| Tracked | To include or exclude tracking this model for coverage |

ModelVariable 510 is a member variable annotated with the ModelVariable attribute. A class may define many member variables, but some of these may be important to the overall model behavior. For instance, in the exemplary pseudo-code 610 of FIG. 6B, the _opened variable tracks if the connection is opened or not. This variable is declared to be a ModelVariable 510 per the bracketed expression 612. A member variable declared to be a model variable thus exposes itself to the engine for tracking behavior. The following properties of Table II are supported on the ModelVariable attribute in accordance with exemplary non-limiting embodiments of the language of the invention.

TABLE II

| Exemplary Properties Supported on ModelVariable Attribute | |
|---|---|
| Tracked | To include or exclude tracking this model for coverage |
| ReplaceWith | Used in deterministic exploration |

With respect to ModelAction 520, every model has methods that change the behavior of the model. These methods are annotated with the ModelAction custom attribute. The methods can correspond one-to-one (1:1) with the actual implementation under test (IUT), or they can be methods that do not execute any actual product code, but are used to help setup the model itself.

The model action attribute, as shown according to bracketed expression 622 in the exemplary pseudo-code 620 of FIG. 6C, exposes the given method, here the Create( ) method, to the engine and enables it to be chosen when its requirements are met.

When the engine executes, any methods that have the model action attribute are considered model actions that can affect the state of the model and could be invoked by the engine. The following properties of Table III are supported on the ModelAction attribute in accordance with exemplary non-limiting embodiments of the language of the invention.

TABLE III

| Exemplary Properties Supported on ModelAction Attribute | |
|---|---|
| Disabled | To include or exclude this action in execution |
| Weight | The relative weight of the action vis-a-vis other actions in the model. |
| Label/Labels | Used to categorize methods based on user-defined labels. These labels can then be used to group methods and find them based on labels. |
| Exception | The expected exception that this method will throw. |
| Exception ID | The identification (ID) of exception to expect for the exception thrown. For example, some exceptions may support IDs for different reasons the exception may occur, each method could have a different ID. In this case, the user may override the "VerifyException" method on the Model to perform a custom ID based verification. |
| Invalid | Used to mark the method as Invalid, these actions can be called if ModelEngineOptions. InvalidActions property is set. |
| CallBefore | Signals to execution engine to call this method before the name action. |
| CallAfter | Signals to execution engine to call this method after the name action. |
| CallFirst | Signals to execution engine to call this method before any other method is called in the model. |
| CallLast | Signals to execution engine to call this method after all other methods are called in the model. |
| CallLimit | Used to specify the maximum number of times a method can be invoked by the execution engine. |
| CallOnce | Used to specify that the execution engine should invoke this method only once. |

A ModelRequirement 530 in accordance with the language defined in accordance with the invention is a condition that is defined on the ModelAction 520 which describes when that method can be called. This is where the behavior of the action and the conditions that must exist for the action to be called are defined. Each action can have multiple requirements and those are evaluated to check if they are satisfied before the action can be chosen or selected to run. For instance, exemplary pseudo-code 630 of FIG. 6D specified a ModelAction at 632 to be weighted according to weight property 632*a*. ModelAction 632 includes two specified requirements, as shown by the bracketed expressions 634 and 636. Accordingly, FIG. 6D shows an example where two requirements are defined on a method which is an action using multiple ModelRequirement attributes, as shown by the bracketed expressions 634 and 636.

Thus, with the language of the invention, as shown in the pseudo-code 630, multiple requirements attributes were used to specify that the Open method can be called only if not already opened (604) and when connection string is set (606). The model requirement attribute supports the ability to construct expressions from different properties. In the above snippet, ConnectionString is expressed to be set by saying "Not=ConnectionString.None", thus the method is chosen only after ConnectionString is set to any other value than ConnectionString.None. The "Not" property is used here, but there are many others available as well. In one non-limiting embodiment of the language of the invention, the exemplary properties of Table IV are defined on the requirement attribute.

TABLE IV

| Exemplary Properties Supported on ModelRequirement Attribute | |
|---|---|
| Variable | The name of the ModelVariable to access for this requirement. |
| Value | The value of the requirement to evaluate against. |
| Not | Used to define a negation expression. |
| Min | Used to define the lower limit of the expression to evaluate for. |
| Max | Used to define the higher limit of the expression to evaluate for. |

TABLE IV-continued

| Exemplary Properties Supported on ModelRequirement Attribute | |
|---|---|
| GreaterThan | Evaluates the expression with the greater than value. |
| GreaterThanEqual | Evaluates the expression with the greater than equal to value. |
| LessThan | Evaluates the expression with the less than value. |
| LessThanEqual | Evaluates the expression with the less than equal value. |
| Any | Evaluates the expression against any of the specified values. |
| Label/Labels | Used to categorize the requirements based on user-defined labels. These labels can then be used to group requirements and find them based on labels. |
| Disabled | Enable or disable a requirement, this allows the engine to dynamically remove some requirements or add requirements. |
| Conjunction | Used to define if the requirement should be Boolean AND or OR with the other requirements for the method. |

In addition to requirements, some actions have parameters, e.g., ModelParameters 540, that define the behavior of the action. Parameters are defined in the testing framework of the invention using a ModelParameter attribute. Sometimes a one-to-one mapping may not be obtained with the actual method in the product code, since representative values for parameters can be chosen or the parameters can be constructed before calling the actual product code.

In accordance with the language defined in accordance with the invention, a model parameter attribute is used to specify a range of values from which to choose for a particular method parameter. When the engine executes the method, the engine then assigns the value of the parameter from the set of possible values for the parameter as specified in the ModelParameter attribute. An example usage is shown in the exemplary pseudo-code 640 of FIG. 6E. Pseudo-code 640 specifies a weight on the function via statement 642. Pseudo-code 640 includes a specification of a requirement 644, and also a specification of a method parameter 646. In one embodiment, the following properties shown in Table V are supported on the parameter attribute.

TABLE V

| Exemplary Properties Supported on ModelParameter Attribute | |
|---|---|
| Disabled | To include or exclude this parameter in execution |
| Weight | The relative weight of the parameter vis-a-vis other parameters in the action. |
| Position | The zero-based index of the method parameter to which this attribute applies, e.g., ModelParameter with Position 0 applies to the first parameter, Position 1 to second parameter and so on. |
| Any | An array of values to choose from for the parameter. |
| Type | The type of parameter to use to decide the value to choose. (Note: mostly used for enum types. The execution then randomly selects an enum value for the type specified.) |
| BitMask | This property is used in conjunction with Type property to specify that the enum value to choose can be multivalued (Flags attribute set on the enum). |
| Exception | Defines the exception thrown for the parameter. |
| ExceptionId | Similar to the action exception ID, this is used to verify the correct exception message. |

The benefits of describing a model with the above-described custom attributes include that (1) it is easy to understand and read, (2) the attributes are IntelliSense aware, (3) one can separate requirements or contracts on the actions and make the model easy to understand and review, (4) there is no need to preprocess the model to gather the requirements and state variables with a separate tool, which can all be part of the engine bootstrap, (5) one can dynamically set the values and parameters in one's code for the attributes; hence, influencing the mode, (6) the custom attributes are supported in any .NET language, (7) the model-based testing framework of the invention is optional, and can be used to supplement existing tests and (8) the custom attributes of the invention enable the ability to build common expressions to represent conditions on methods which are enough to describe the contract for the method.

The use of custom attributes to describe the model is a part of the overall framework of the invention, yielding considerably dynamic test flexibility and ease of use.

Returning to the above-described connection example, the connection model can be described using the custom attributes of the testing framework of the invention, as shown in the exemplary pseudo-code 700*a* and 700*b* of FIGS. 7A and 7B. Pseudo-code 700*a* and 700*b* together represent connection model as annotated with the custom attributes of the invention. As shown, model attribute 702 and flags 704 are observed as annotated in pseudo-code 700*a*. Model variables 706*a*, 706*b* and 706*c*, model actions 708*a*, 708*b*, 708*c*, 708*d*, 708*e*, 708*f* and 708*g*, model requirements 710*a*, 710*b*, 710*c* and 710*d* and model parameter 712 are also added to the connection code represented in pseudo-code 700*a* and 700*b*. Thus, one can see that the invention enables the semantics of the model to be incorporated directly into the pseudo-code 700*a* and 700*b*, whereby an engine component can then interpret the custom attributes to model the behavior of the code based thereon.

From pseudo-code 700*a* and 700*b* of FIGS. 7A and 7B, it is observable that instead of managing individual states, instead, the behavior of the software object is modeled. The three declared variables 706*a*, 706*b* and 706*c* keep track of various states. Methods are defined with requirement attributes 710*a*, 710*b*, 710*c* and 710*d* and those methods are chosen when their requirements are met. At any given point, multiple actions 708*a*, 708*b*, 708*c*, 708*d*, 708*e*, 708*f* and 708*g* could be possible and hence when the random selection is done, new and interesting paths will be executed.

Accordingly, FIGS. 7A and 7B demonstrate how to model a class from the beginning, but frequently new features are added to existing classes as development progresses, or new versions are released. With or without modeling, verification code needs to be written to ensure that any new method behaves as expected. With the modeling techniques of the invention, verifying such new methods becomes straightforward. Since the model itself keeps track of the state in which the object should be, this mechanism can be used in the verification of results.

Code snippet 800 of FIG. 8A serves as an example of a sample static connection test. In accordance with the model-based test techniques of the invention, this static code can be converted to the "dynamic" code snippet 810 of FIG. 8B.

In the model based test of code snippet 810, whether Open works is verified, and coverage is obtained over the entire behavior of Open as opposed to merely obtaining coverage for just a static connection string every time. Open should work every time and this is exactly what the test of FIG. 8B targets. If a new method to be called before Open is added, all the static scenarios require updating. In the dynamic example represented by code snippet 810, the model behavior is changed only at one place, updating all tests automatically, thereby saving a lot on future maintenance.

Just as an API is modeled, input data can be modeled in accordance with the invention. A model can be built for the structure of data and the model can be executed to generate interesting data. There is often a need for generating data dynamically. In the example of FIGS. 8A and 8B, suppose the set connection method takes a connection string. The connection string itself has interesting structure. In static tests, SetConnectionString is given the same fixed data and verification code is written to verify only that output. Once a test is written, its only use is regressions; the test is never going to try another connection string. Hence, a different connection string pattern may be missed. By modeling the connection string itself in accordance with the invention, different connection strings can be generated and hence different connection tests.

A sample connection string modeling example is shown in pseudo-code 900*a* and 900*b* of FIGS. 9A and 9B. The connection string model is defined via the bolded custom attributes of pseudo-code 900*a* and 900*b* and the connection string model can itself generate interesting connection strings. If verification of the type of connection being opened in the connection model is required, the variables can be inspected to know what type of connection string was created.

The language features of the invention have thus far been described that enable modeling software objects, such as APIs or data structures. However, an engine, i.e., a finite state machine which drives the execution, is also enabled in accordance with the invention that integrates all the custom attributes into test automation and existing frameworks.

Figure 10A:
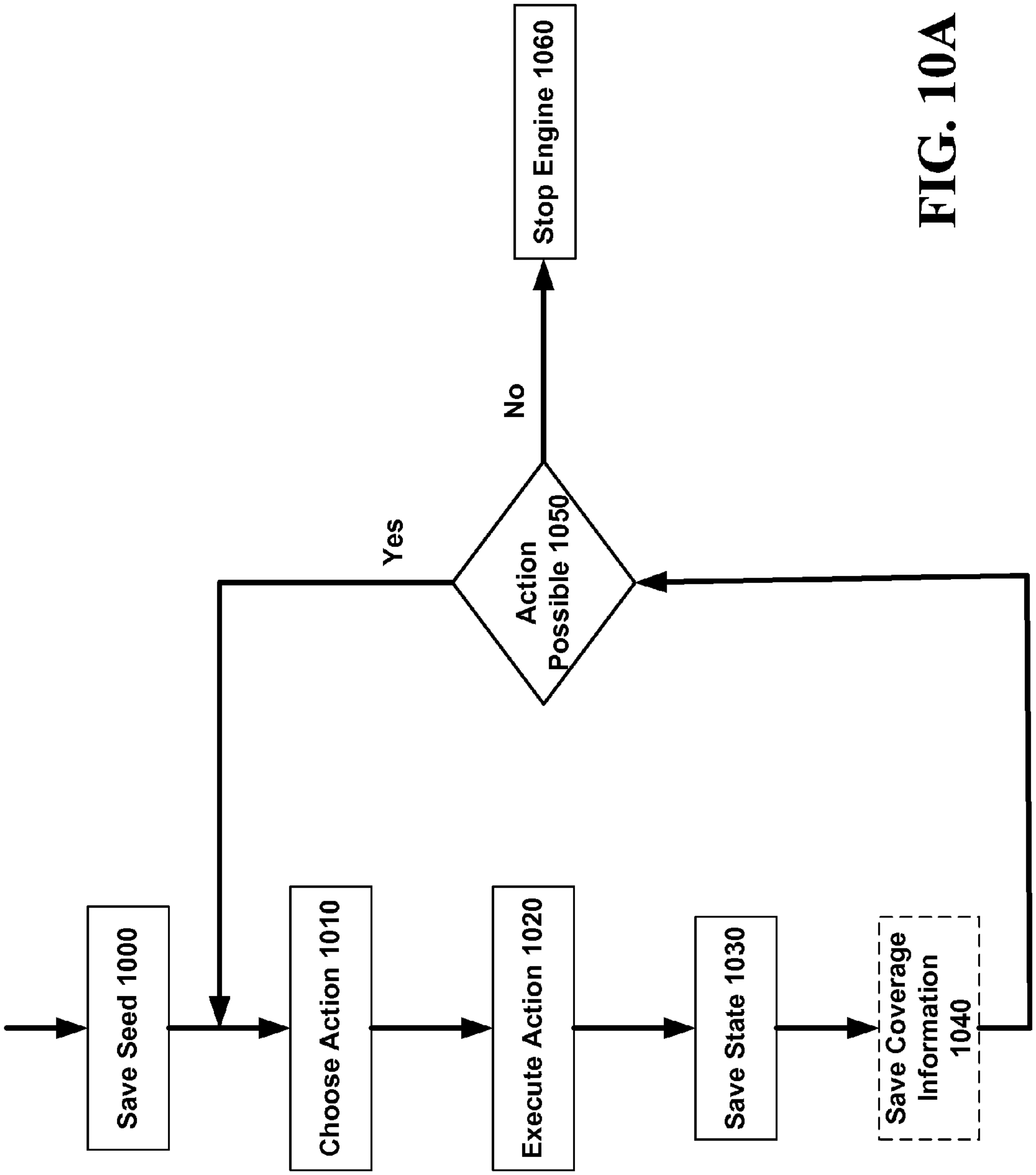
FIGS. 10A, 10B, 10C and 10D are exemplary, non-limiting flow diagrams of various features of the invention include annotation with custom attributes, dynamic influencing, separation of model based testing and non-model based testing, and run-time handling of actions by the engine of the invention.

In accordance with the language of the invention, a model is designed and then passed to the engine which executes actions when certain requirements are met. The diagram of FIG. 10A shows an overview of engine execution. At 1000, a seed is optionally saved to create a point for reproduceability purposes. At 1010, an action of the model is chosen and at 1020, the action is executed. At 1030, the state is saved resulting from execution of the action, and the coverage information is optionally saved at 1040. Then, at 1050, it is determined whether more actions are possible. If so, then the flow proceeds to 1010 to repeat the foregoing steps. If not, then the engine stops at 1060.

Thus, in one aspect described herein, the invention provides a method for describing a model of a software process in a computer system based on a language that is incorporated into program itself. As shown in the flow diagram of FIG. 10B, program code 1002 is annotated at 1012 with the above-described custom attributes and requirements to describe the model within the program code 1002 itself. Then, the models for the program code 1002 are describable by the invention at 1022 based on the custom attributes and requirements. At 1032, the models are then ready for execution and testing.

Figure 10B:
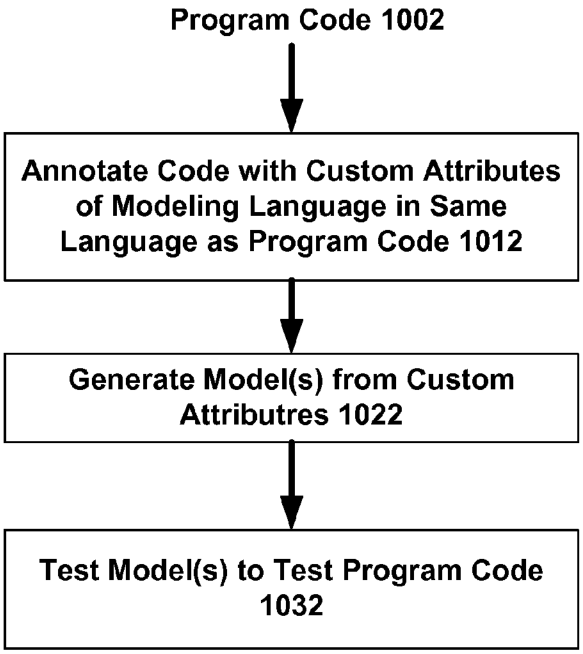
Figure 10C:
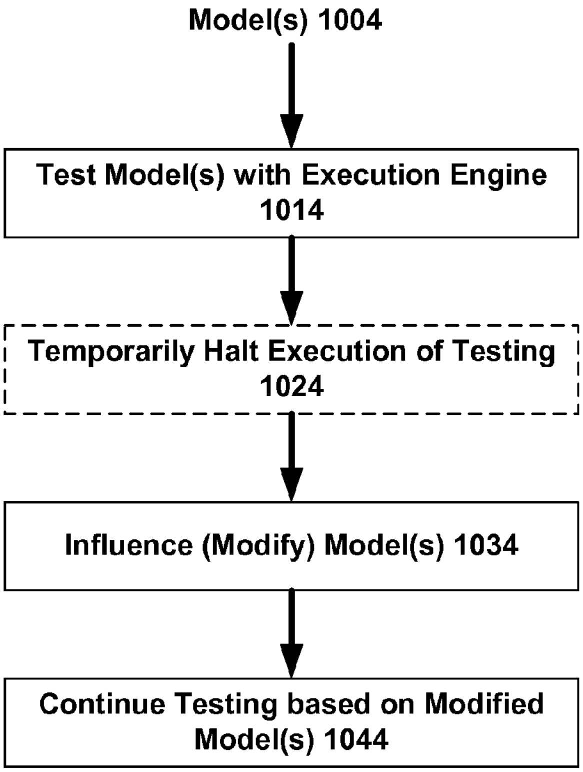

In another aspect described herein, the invention provides a method and corresponding test tool for enabling dynamic influencing of a testing procedure for testing a model at run-time. For instance, as described, weights on actions and models can be dynamically altered during testing of the models, models can be altered, and/or new models can be added all during run-time in order to dynamically influence the testing process. As shown in the flow diagram of FIG. 10C, model(s) 1004, e.g., models generated according to the process of FIG. 10B, are tested via an execution engine at 1014. Optionally, at 1024, during run-time, the testing can be temporarily halted to allow a user to influence the model(s) being tested at 1034. Then, advantageously, the testing is continued based on the modified model(s) at 1044.

Figure 10D:
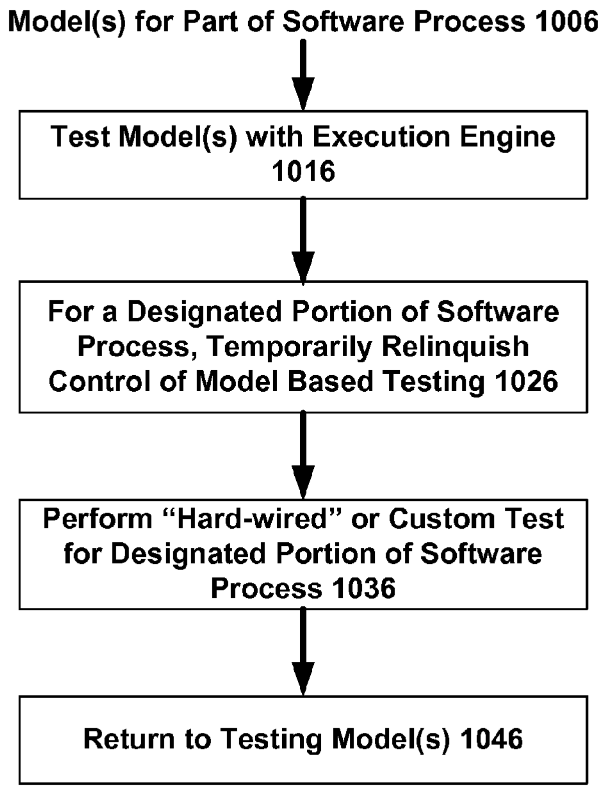

In a further aspect of the invention described herein, model based testing and non-model based testing can be combined in the same testing process so that parts of a process that do not lend themselves to MBT can be modeled in a hard-wired or custom way, according to more traditional test techniques. As shown in the flow diagram of FIG. 10D, model(s) 1006 are tested at 1016 with an execution engine. At 1026, model based testing ceases for a portion of testing the process to allow a traditional, or custom test, to be performed at 1036. Once the custom tests are complete for the designated portion of the process, at 1046, the execution engine can continue running the other modeled portions of the process. Thus, advantageously, the invention does not provide an all or nothing modeling test tool.

Figure 10E:
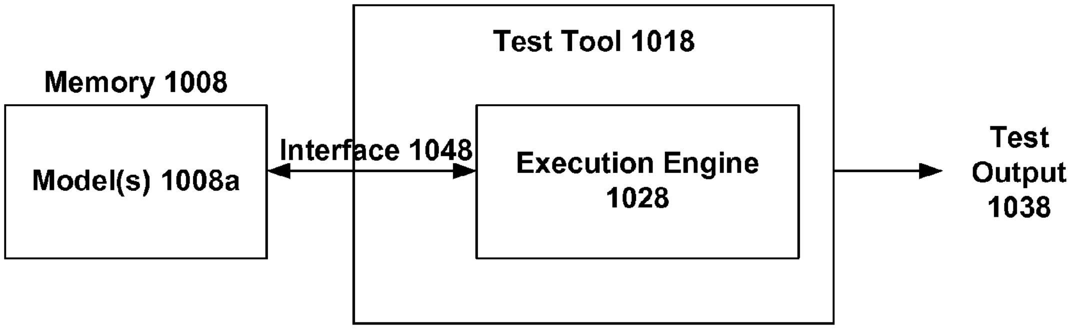
FIG. 10E is a block diagram illustrating an exemplary test tool operating environment for the present invention.

Any of the methods of the invention may be practiced in the environment illustrated in the block diagram of FIG. 10E, wherein a test tool 1018 includes an execution engine for interpreting and testing models 1008*a* of memory 1008 via interface 1048. The test tool includes a test output 1038, which may be an indication of bugs, a user interface for a user, such as a display. A user may also interact with the test tool via a user interface (not shown), in order to influence the testing performed by the execution engine 1028 as described elsewhere herein.

Various features of the engine of the invention along with corresponding examples and samples of how to utilize the engine of the invention are described in more detail below. For instance, the constructor for the engine of the invention may take the model (or models) as a parameter, according to sample #1 below.

| Sample #1 |
|---|
| ConnectionModel connectionModel = new ConnectionModel( );<br>ModelEngine me = new ModelEngine( connectionModel ); |

Multiple models can be added to the engine by passing them to the constructor according to sample #2 or sample #3 below.

Sample #2

```
ConnectionModel connectionModel = new ConnectionModel( );
ConnectionStringModel connectionStringModel =
new ConnectionStringModel( );
ModelEngine me = new ModelEngine( connectionModel,
connectionStringModel );
```

Sample #3

```
ConnectionModel connectionModel = new ConnectionModel( );
ConnectionStringModel connectionStringModel = new
ConnectionStringModel( );
ModelEngine me = new ModelEngine( );
me.Models.Add( connectionModel );
me.Models.Add( connectionStringModel );
```

As shown by sample #4, existing models can be retrieved in accordance with the invention as follows.

Sample #4

```
ConnectionModel cModel =
me.Models.Find(typeof(ConnectionModel).ToString( ));
```

An exemplary aspect of engine design of the invention is making it easy for testers to be able to dynamically influence the models. Weighting is one aspect of this, as defined by the custom attributes of the modeling language discussed in detail above.

However, for additional consideration, suppose a model is created and some weights are specified on the model according to the custom attributes of the invention, and then someone wants to write a test that analyzes only a subset of actions supported on the model. The testing framework of the invention achieve the ability to do this. In this regard, the testing framework allows this to be done by letting users control the weights as well as allowing disabling of each item at runtime, enabling dynamism of the framework.

As an illustrative example of influencing according to the invention, pseudo-code 1100 of FIG. 11A receives a connection model and finds all actions other than Init, SetString and Close and sets their weights to zero. The state diagram is thus pruned to just these three methods and thus what actions are available can be controlled. Testers can thus write focused tests on the behavior they are testing, e.g., one or more subprocesses of interest, rather than being required to write end-to-end test code for all behaviors. In the next test case, one might want to test just the Init, Get and Close methods, in which case one can write a separate test variation to target that scenario in accordance with the invention. Similar to FIG. 11A. one would write a test code snippet that receives a connection model and finds all actions other than Init, Get and Close, and set their weights to zero.

Every item thus may be assigned a weight and the weights can be dynamically changed at runtime through the engine, and thus the execution of the engine can be influenced by the user dynamically according to test methods of interest.

"Executing up to a state" is another feature of the engine of the invention, allowing the engine to be extremely flexible about when it will stop. This feature also makes all the existing static tests easy to migrate once a model has been written. The RunUntil method on the engine, which has been included in some of the foregoing exemplary pseudo-code, allows a tester to run the engine until a specified state or requirement has been met and then halt the engine.

For example, code 1110 of FIG. 11B illustrates at statement 1112 a Run Until method that runs until Opened is in the yes state. There are other possibilities using the Run Until statement of the invention as well, such as the utilization demonstrated in code 1120 of FIG. 11C. The engine thus also allows the building of a ModelRequirement class and then allows such objects to be passed in. The invention thus enables halting at any desired state.

As mentioned previously, one of the complaints against existing test tools is that there are all-or-nothing approaches, but with the kind of control enabled by the invention, testers can choose their level of modeling.

In some cases, writing directed tests is inevitable, and in such cases, the engine of the invention does not get in the way when such is desired by the user. For instance, suppose in the connection model discussed herein, it is specifically interesting to perform a customer scenario of Init, SetConnectionString, GetConnectionString and Open, and manual control is desired on the execution. For this case, the methods on the model can be directly called by the user. In such case, the engine of the invention can be ignored and the model code can be reused since the model is just another plain old CLR class.

With respect to bug reproduction, during testing, a few regression cases are added back even though the engine can guarantee certain paths are covered, however, the same specific test may need to be specified the same way it first failed. To do this, a seed on the machine can be set which will then generate the same exact random sequence to give the bug, as shown in the exemplary pseudo-code 1130 of FIG. 11D.

It is noted that using seeds to generate regression tests is not advisable as a long term solution. While seeding can be a quick and easy way to reproduce a problem, if the model evolves, the seeds may no longer apply and will not produce the same exact execution path. Thus, to ensure that the problem is reproduced, the regression test should not depend on seeds, but rather the actual action sequence. In this regard, the testing framework of the invention allows inspection of the action sequence, in one embodiment, by using an Engine.ActionsTrace property. However, the reproduction itself can reuse the model code.

If there is a quick fix engineering (QFE), and a guarantee that the model will execute the suggested path is needed, the error can be reproduced using a seed, or if a regression is found, a test can quickly be put back in. As a projection, even if 20% of tests have to be directed over time due to these situations, they can all still reuse the model code.

Thus, as shown by the exemplary pseudo-code 1140 of FIG. 11E, the engine has the ability to keep executing a model for a specified amount of time. This can be useful in stress situations, in models that never finish or when there is no end state. The engine offers options to set to determine the time that it should spend on executing the model. Pseudo-code 1140 executes the model for 30000 seconds, as shown, and hence could be used in stress scenarios or when a timed execution is required.

With respect to executing set actions count, the MaxActions property on the engine allows the user to specify the maximum number of actions to execute. Once a bug has been found, sometimes testers wish to find more related bugs around that state. Instead of writing static code every time to go to that state, the testing engine can take the seed and the max actions to execute and halt at the state just before the bug was found. This is demonstrated, for instance, by pseudo-code 1150 of FIG. 11F. The MaxActions property of the engine of the invention can save time for testers to handcraft the test code after finding a bug and also provides a better way to factor code.

As mentioned, each custom attribute can have weights in accordance with the invention. Weights can be advantageous when a certain parameter or action is chosen. Instead of asking the tester to provide custom weights, some additional overall schemes can be used to determine these choices as well. The exemplary pseudo-code 1160 of FIG. 11G shows how to set weighting scheme choices from the following exemplary list of choices.

Equal: Each item has equal probability of being chosen.

AdaptiveEqual: Each item once chosen is lowered in priority the next time.

Custom: User defined weights for items (default)

Geometric: Each item has n times (e.g., twice) the probability than the next item to be chosen.

With the testing framework of the invention, since the path through the state diagram can vary, sometimes it is desirable to verify that certain methods have been covered or certain paths have been "hit" by the test or not, and if not, to restart the model until those paths have been hit. The testing framework of the invention exposes the coverage information to users in an easy way and hence users can make their own decisions about when to stop executing. The exemplary pseudo-code 1170 of FIG. 11H shows how this can be achieved in accordance with the invention.

In example code 1170, the methods to be covered (SetString, GetString and Open) are specified. Then, the model keeps running until all those actions have been accessed at least once. This ability gives the confidence that each method has been executed at least one time, and may be useful for writing pri-0 tests and determining when to stop. This ability also lets model based tests to be automated with reasonable guarantees about coverage. The testing framework of the invention also reports the actual number of times a method or parameter was accessed, which again could be useful for writing tests.

Another advantage of the coverage functionality enabled by the invention is the ability to track a variable. For instance, sometimes it is desirable to find out if a particular variable has been covered, by which it is meant that all the values that the variable can assume have been covered during test. In the connection model, for instance, suppose it is desired to measure if all the variable values have been hit at least once. This can be done by setting the VariableTracking property on the engine, which is illustrated by the exemplary pseudo-code 1180 of FIG. 11I.

In this regard, example pseudo-code 1180 keeps executing until the time has elapsed or until all the values of the variables have been chosen at least once, guaranteeing complete variable coverage. In automation scenarios, it is quite useful to know when tests are complete. One can also choose a set of variables to track and track only those variables, per the following exemplary statement.

model.Variables.FindExcept("_opened").Track=false;

The above code statement, for instance, finds all the variables except "_opened" and turns tracking off for those variables. The engine then specifically tracks only the "_opened" variable and can halt if all the values for that have been covered. Thus, variable targeted tests can be written to guarantee coverage and instill confidence in testing. With past testing models, all values may or may not be covered and there is no way of being completely sure except by code reviews that all values are covered. The invention thus provides a more automated and deterministic way of ensuring coverage for variables.

Using the testing framework of the invention, it is also possible to combine two models. For instance, described herein in various examples, two models have been described: the Connection model and the ConnectionString model. The connection model attacks the behavior of the connection object and the ConnectionString model attacks the format of the connection string. Ideally, it should be possible to reuse the connection string model in the SetConnectionString API on the connection object. Referring to other models is an advantageous ability for any MBT tool, which allows for better code reuse and dynamic tests. The exemplary pseudo-code 1190 of FIG. 11J shows a simple way to achieve this using the testing framework of the invention. In example code 1190, the Set method creates a model and then runs the model until it generates a valid connection string. This string is then used in the connection model to open a connection.

A 1:1 relationship is thus observed between the two models, however it is also possible to create a 1:Many relationship between models. In a 1:Many scenario, multiple models are created, used and then stored in the parent model. For an example of how to use this, modeling can tried for the commands for each connection. Since there can be multiple commands for each connection, multiple command models can be used for each connection, which is thus another useful feature supported by the framework.

This can save time for testers who have to write two different code libraries for positive and negative testing. The static negative tests are always executing a certain path, however, using the MBT techniques of the invention, the behavior can be modeled and failures can be expected when the model is supposed to fail.

Modifying an existing model can present additional challenges. For instance, if one additional method is added to the model, there may be existing seed-based tests that may no longer work since now the random function has one more value from which to choose. This scenario may be worsened when you tests are already placed in automation. To reproduce those bugs again with new seeds may be challenging.

At least two ways to solve this issue are provided in the framework of the invention. One way to solve this problem is to always extend the model when a new feature is added to the model. This way, existing tests use the base model and hence are not affected and the new tests that are written can use the extended model. This is illustrated by base model example code 1200 of FIG. 12A and by extended model example code 1210 of FIG. 12B.

Advantages of this approach include that (1) it is easy to separate and group the new feature work in a separate model, (2) bug reproductions based on seed(s) are not affected since they are influenced by only old methods and (3) no changes are necessary.

From a maintenance standpoint, if it is desired that the new method be part of all the functional tests, the old tests are manually updated to now take the ExtendedModel instead of BaseModel.

In addition to extending the base model when a new feature is added, another way to solve this problem is by using a version property on all attributes. The version property is then used to denote a particular version of model and when a new feature is added, the version is incremented for those attributes. Thus, seed based bug reproduction can be tied to a particular version and the engine will then select only methods from or below that version. At the same time, new tests can automatically receive the new feature and work on all versions. Versioning can also be made customizable to a point where the user can specify the range of versions from which to choose. Thus, versioning can solve the problems associated with updating models with new features and demonstrates the advantages and suitability of MBT for test automation.

As mentioned briefly above, with the testing framework of the invention, modeling is not a do-everything or do-nothing option because partial modeling of the portions of a program that make sense is achievable. Instead, with the invention, slowly, richer models can be built and integrated in existing tests.

It is desired that existing test automation frameworks be able execute tests designed according to the language and engine of the invention. Since paths are taken and executed randomly, a question arises as to how it is ensured that all the tests work correctly in each run. The question bears on how failures can be reproduced or the execution can be reproduced if the test suite is restarted. With the testing framework of the invention, as described above, since seed(s) can be set to the model engine, a predefined seed can be set for each run and hence, it can be ensured that any rerun during the same run can reproduce the error again.

Thus, the model based testing language and framework of the invention provides a variety of benefits and advantages, as described above, in comparison to prior custom approaches. It can also be appreciated that the techniques of the model based testing language and framework of the invention can be supplemented, augmented, combined, or permuted with additional optional features and functionality. Accordingly, described below are some exemplary, non-limiting features and functionality, e.g., deterministic tests, model engine state, etc., that may optionally be implemented in connection with embodiments of the model based testing language and framework of the invention.

With respect to optional implementations of deterministic test generation, for instance, deterministic traversal of a model allows exhaustive discovery of every reachable state in accordance with the invention. This is achieved with a modified depth-first search of the associated graph that ignores previously visited states. This process utilizes a finite model with a reasonable number of states.

If a model meets these criteria, complete coverage of the model is then considered. Complete coverage can mean several different things:

Complete state coverage: Visit each state at least once.

Complete action coverage. Invoke each action at least once.

Complete transition coverage. Visit each state via all possible actions at least once.

With respect to complete sequence coverage, i.e., executing each possible sequence of transitions for the given graph, generally, the sequence may be restricted to be of a length less than some pre-defined maximum. Otherwise, an unmanageable number of tests might be generated.

Attempting to achieve these goals by random traversal is possible, but such a process could be very computationally expensive. To illustrate this problem, imagine a simple example where an interesting state is only reachable by choosing one particular action out of five possible actions five times in a row. The odds of hitting this sequence are: $5^5$, or 1/3125. If it is desirable to achieve full state coverage, this can be achieved with a number of tests equal to the number of states, i.e., many models, here five models, can achieve this level of coverage with far fewer tests.

Deterministic exploration also enumerates every reachable state. When exploring the graph at random, one can attempt to run until a given state is reached or until failure, but it cannot be known a priori if that state will ever be visited. This concrete view of the abstract graph allows the rendering of a visual representation of the paths for review so that more sophisticated execution plans can be designed.

There are some differences from random test generation. Supporting deterministic exploration, which is optional in accordance with the invention, places a number of additional restrictions on the code and data structures in a model. For instance, (1) states become entirely self-contained while exploring, (2) the model does not invoke any implementation code while exploring, (3) state variables comprise language primitives or are ISerializable, or else CallBefore, CallAfter, CallFirst, or CallLast may not be used. For example, one may consider overriding the Init( ) method to handle any setup for a model requires, or setup can also be explicitly handled using model state.

The capability to distinguish between code that should run during exploration and execution with the .IsExecuting property on the Model base class is also optionally provided in accordance with the invention. Any code that touches the implementation may be wrapped in an if (this.IsExecuting) block.

Figure 13:
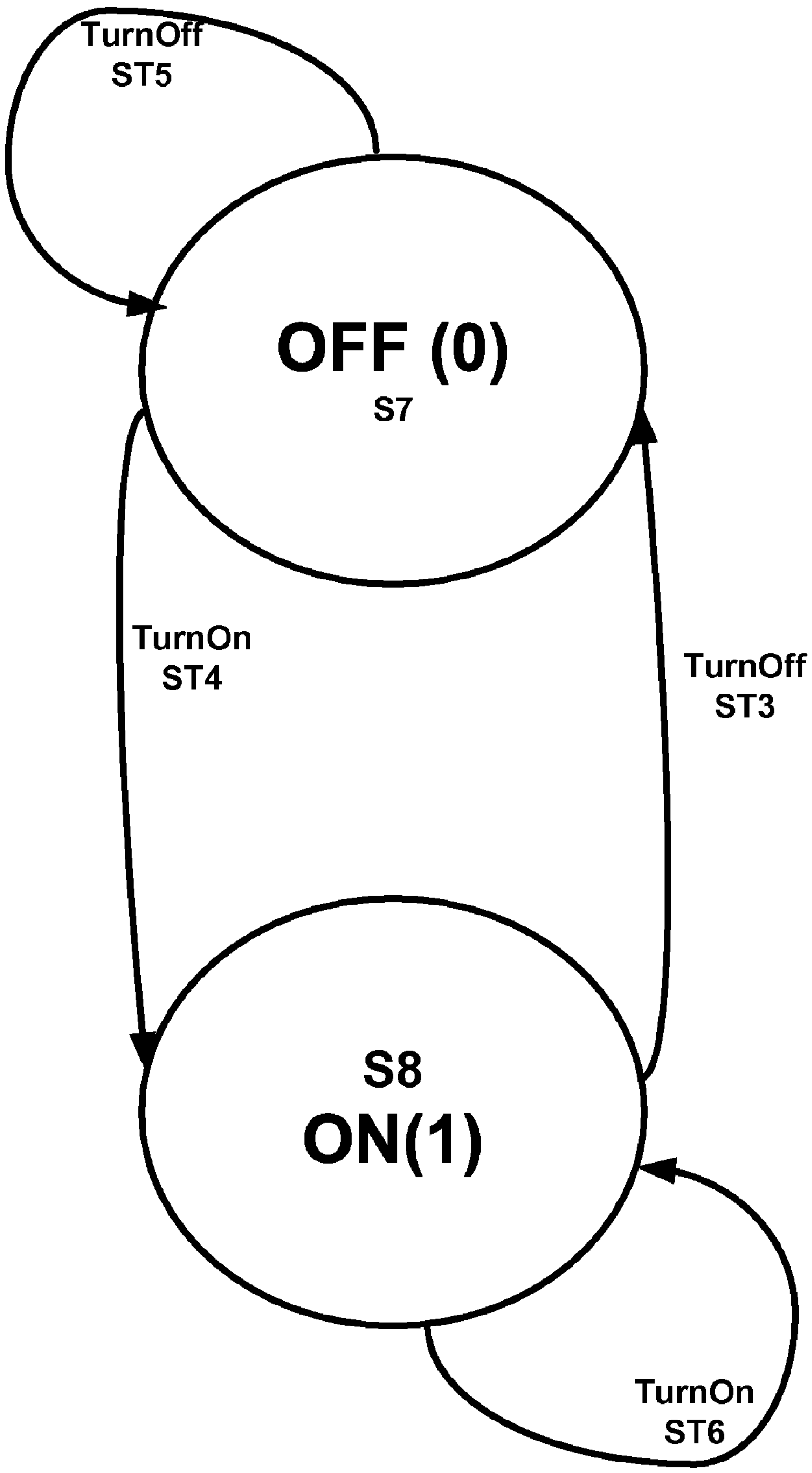
FIG. 13 is an exemplary model for a light switch and the corresponding state graph in accordance with modeling of the invention.

For instance, a simple model for a light switch and the corresponding state graph are shown in FIG. 13, wherein states off and on are represented by states S3 and S4, respectively. Turnoff transitions ST3 and ST5 enter the off state S3 and turn on transitions ST4 and ST6 enter the on state S4. The light switch can be modeled according to pseudo-code 1400 and 1410 of FIGS. 14A and 14B, including the bolded custom attributes of the invention.

As a non-limiting exemplary way to display the state graph, a variety of software techniques can optionally be used to provide a rendered graph of the model, such as the model represented in FIG. 13, and as represented by code 1400 and 1410 of FIGS. 14A and 14B.

The invention also optionally includes a graph exploration object model. Generating test cases from a model can thus optionally be performed in two steps: graph exploration and sequence generation. The invention allows exploring the state graph and obtaining a graph node for the initial state of the model. A model explorer enables each possible state to be visited and can notify another component, the ModelGraphBuilder, when a new transition is traversed. In one non-limiting embodiment, the maximum number of states is set at a predetermined number, e.g., 300, to ensure that exploration is stopped with a ModelException if the graph grows too large.

Sample code 1500 demonstrates the optional ability to exhaustively enumerate transition sequences. In one non-limiting implementation, the enumerator for ExhaustiveTraversal returns an IList of ModelActionKey objects. ModelActionKey thus provides an engine-independent way to refer to a particular transition. This also allows the use of one ModelEngine to generate a test and another ModelEngine to execute the test.

With respect to optional filtering techniques, some models generate long sequences of uninteresting transitions. Actions that do not change state, such as exception handling cases or re-reading cached values, are one source of these. Another frequent cause of transition bloat is pairs of opposed actions such as Add and Remove.

There are at least two optional ways to handle this. The first optional way is to build restrictions into the model, i.e., limits or model variables can be called to track and restrict the number of times the actions have been invoked. This approach can be used, for instance, in the light switch sample to avoid calling the invalid transitions more than once per traversal. The second optional way is to use traversal filtering support. ExhaustiveTraversal provides events that can be used to influence the traversal algorithm. This decouples the constraints from the model and allows variation on the constraints between different test runs. Also, using action names for categorization is one practice, while an alternative practice is to use named categories.

Another optional alternative to filters and explicit restrictions on transitions is to collapse similar states, i.e., to reduce the number of state combinations with the ReplaceWith parameter on the ModelVariableAttribute. This allows use of a complex set of values for a variable (such as an unbounded 32-bit integer), but for the purposes of calculating unique states, it will be reduced to a set of equivalence classes.

It is noted that if equivalent states are not directly adjacent, some of them may be rendered unreachable by collapsing them. Example: Suppose there is a state variable Count and an action Increment( ). If the equivalence classes are {0, few (1-4), many (5+)} and Increment( ) is implemented as Count++, the "many" state will never be reached because exploration will stop at 2. Both 1 and 2 are in the "few" class.

With respect to working with the engine state in accordance with further optional implementations of the invention, the current state of the engine is determined by serializing all of the model variable values from all models in the engine. In one non-limiting embodiment, this byte array is hashed to obtain an identifier that is highly likely to be unique. This is converted to a string and can be used as an IComparable identifier for the state.

Engine state is represented by the ModelEngineState object. This type allows snapshot and restore of the state of the ModelEngine to a given point in time. Users can use the ModelEngineState to compare one state to another. Alternatively, the UniqueIdentifier property can be used for this purpose.

As described herein, an extensive sample has been shown regarding how SQLConnection object can be modeled using the invention. Among other things, the example shows how models can be linked dynamically from one model to another, shows how Invalid paths are tested and shows it working with the actual product calls.

Herein, the following topics have been generally covered at various levels of exemplary, non-limiting and illustrative detail: Traditional Testing, Evolution of the testing framework of the invention, hand-crafting, code-sharing, data-driving, specification modifications, modeling, misconceptions, modeling all, finite state machines, Testing framework, Testing language, Models (ModelVariable, ModelAction, ModelRequirement, ModelParameter), modeling API tests, modeling data, engine, adding models, execution scenarios, reproduction of bugs, timed exploration, executing "up to a state," executing set action count, weighing processes, auto-restart, influencing the engine, model coverage, linking models, negative testing, modifying models, test automation, deterministic test generation, random test generation, rendering finite state graphs, graph explorer object model, filtering, collapsing similar states and working with engine state.

Exemplary Programming Environments

One of ordinary skill in the art can appreciate that the techniques of the invention are not limited to any particular programming language environment. In this regard, while exemplary embodiments have been described herein in the context of C#, .NET, Spec#, or other particular programming language execution environments, it is here emphasized that the invention can be applied in any programming environment, language or framework.

Thousands of different programming languages have been created and new ones are created every year. Accordingly, the techniques of the invention can be applied to virtually any programming language code that can be used to control the behavior of a machine, such as a computer, to apply the test techniques of the invention. More specifically, the invention can be applied to any programming language having the ability to specify behavior in code (e.g., metadata) in order to implement the modeling language of the invention and that provides the ability to interpret such code at execution time (i.e., reflection). Thus, for the avoidance of doubt, the invention should not be considered to be limited to any one particular programming language or environment.

Exemplary Networked and Distributed Environments

One of ordinary skill in the art can appreciate that the invention can be implemented in connection with any computer or other client or server device, which can be deployed as part of a computer network, or in a distributed computing environment, connected to any kind of data store. In this regard, the present invention pertains to any computer system or environment having any number of memory or storage units, and any number of applications and processes occurring across any number of storage units or volumes, which may be used in connection with processes for testing in accordance with the present invention. The present invention may apply to an environment with server computers and client computers deployed in a network environment or a distributed computing environment, having remote or local storage. The present invention may also be applied to standalone computing devices, having programming language functionality, interpretation and execution capabilities for generating, receiving and transmitting information in connection with remote or local services and processes.

Distributed computing provides sharing of computer resources and services by exchange between computing devices and systems. These resources and services include the exchange of information, cache storage and disk storage for objects, such as files. Distributed computing takes advantage of network connectivity, allowing clients to leverage their collective power to benefit the entire enterprise. In this regard, a variety of devices may have applications, objects or resources that may implicate the testing framework of the invention.

Figure 16:
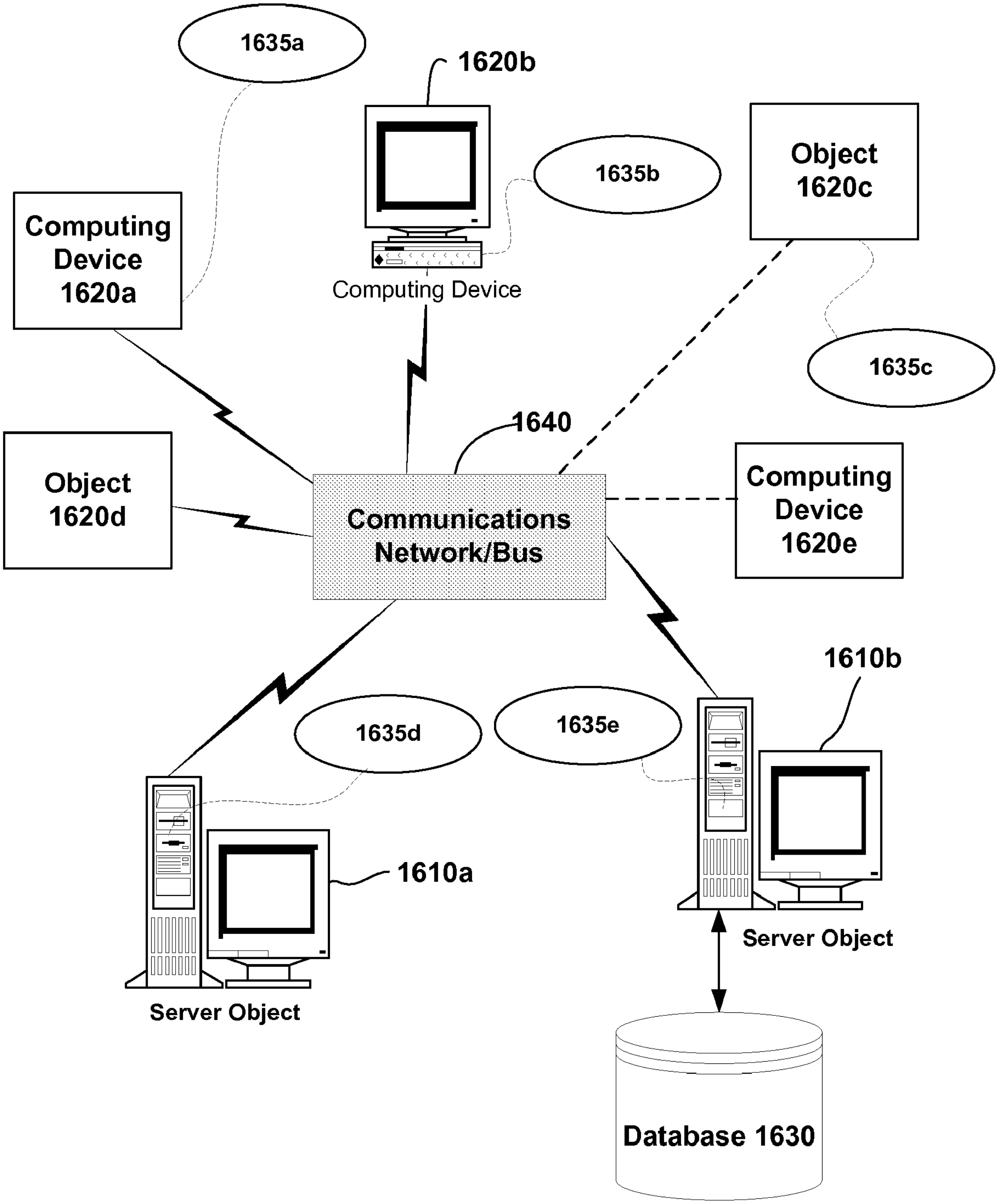
FIG. 16 is a block diagram representing an exemplary non-limiting networked environment in which the present invention may be implemented.

FIG. 16 provides a schematic diagram of an exemplary networked or distributed computing environment. The distributed computing environment comprises computing objects 1610*a*, 1610*b*, etc. and computing objects or devices 1620*a*, 1620*b*, 1620*c*, 1620*d*, 1620*e*, etc. These objects may comprise programs, methods, data stores, programmable logic, etc. The objects may comprise portions of the same or different devices such as PDAs, audio/video devices, MP3 players, personal computers, etc. Each object can communicate with another object by way of the communications network 1640. This network may itself comprise other computing objects and computing devices that provide services to the system of FIG. 16, and may itself represent multiple interconnected networks. In accordance with an aspect of the invention, each object 1610*a*, 1610*b*, etc. or 1620*a*, 1620*b*, 1620*c*, 1620*d*, 1620*e*, etc. may contain an application that might make use of an API, or other object, software, firmware and/or hardware, suitable for use with the systems and methods for model based testing in accordance with the invention.

It can also be appreciated that an object, such as 1620*c*, may be hosted on another computing device 1610*a*, 1610*b*, etc. or 1620*a*, 1620*b*, 1620*c*, 1620*d*, 1620*e*, etc. Thus, although the physical environment depicted may show the connected devices as computers, such illustration is merely exemplary and the physical environment may alternatively be depicted or described comprising various digital devices such as PDAs, televisions, MP3 players, etc., any of which may employ a variety of wired and wireless services, software objects such as interfaces, COM objects, and the like.

There are a variety of systems, components, and network configurations that support distributed computing environments. For example, computing systems may be connected together by wired or wireless systems, by local networks or widely distributed networks. Currently, many of the networks are coupled to the Internet, which provides an infrastructure for widely distributed computing and encompasses many different networks. Any of the infrastructures may be used for exemplary communications made incident to model based testing according to the present invention.

In home networking environments, there are at least four disparate network transport media that may each support a unique protocol, such as Power line, data (both wireless and wired), voice (e.g., telephone) and entertainment media. Most home control devices such as light switches and appliances may use power lines for connectivity. Data Services may enter the home as broadband (e.g., either DSL or Cable modem) and are accessible within the home using either wireless (e.g., HomeRF or 1602.11B) or wired (e.g., Home PNA, Cat 5, Ethernet, even power line) connectivity. Voice traffic may enter the home either as wired (e.g., Cat 3) or wireless (e.g., cell phones) and may be distributed within the home using Cat 3 wiring. Entertainment media, or other graphical data, may enter the home either through satellite or cable and is typically distributed in the home using coaxial cable. IEEE 1394 and DVI are also digital interconnects for clusters of media devices. All of these network environments and others that may emerge, or already have emerged, as protocol standards may be interconnected to form a network, such as an intranet, that may be connected to the outside world by way of a wide area network, such as the Internet. In short, a variety of disparate sources exist for the storage and transmission of data, and consequently, any of the computing devices of the present invention may share and communicate data in any existing manner, and no one way described in the embodiments herein is intended to be limiting.

The Internet commonly refers to the collection of networks and gateways that utilize the Transmission Control Protocol/Internet Protocol (TCP/IP) suite of protocols, which are well-known in the art of computer networking. The Internet can be described as a system of geographically distributed remote computer networks interconnected by computers executing networking protocols that allow users to interact and share information over network(s). Because of such wide-spread information sharing, remote networks such as the Internet have thus far generally evolved into an open system with which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the illustration of FIG. 16, as an example, computers 1620*a*, 1620*b*, 1620*c*, 1620*d*, 1620*e*, etc. can be thought of as clients and computers 1610*a*, 1610*b*, etc. can be thought of as servers where servers 1610*a*, 1610*b*, etc. maintain the data that is then replicated to client computers 1620*a*, 1620*b*, 1620*c*, 1620*d*, 1620*e*, etc., although any computer can be considered a client, a server, or both, depending on the circumstances. Any of these computing devices may be processing data or requesting services or tasks that may implicate the model based testing in accordance with the invention.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques for model based testing of the invention may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

Thus, FIG. 16 illustrates an exemplary networked or distributed environment, with server(s) in communication with client computer (s) via a network/bus, in which the present invention may be employed. In more detail, a number of servers 1610*a*, 1610*b*, etc. are interconnected via a communications network/bus 1640, which may be a LAN, WAN, intranet, GSM network, the Internet, etc., with a number of client or remote computing devices 1620*a*, 1620*b*, 1620*c*, 1620*d*, 1620*e*, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to test software.

In a network environment in which the communications network/bus 1640 is the Internet, for example, the servers 1610*a*, 1610*b*, etc. can be Web servers with which the clients 1620*a*, 1620*b*, 1620*c*, 1620*d*, 1620*e*, etc. communicate via any of a number of known protocols such as HTTP. Servers 1610*a*, 1610*b*, etc. may also serve as clients 1620*a*, 1620*b*, 1620*c*, 1620*d*, 1620*e*, etc., as may be characteristic of a distributed computing environment.

As mentioned, communications may be wired or wireless, or a combination, where appropriate. Client devices 1620*a*, 1620*b*, 1620*c*, 1620*d*, 1620*e*, etc. may or may not communicate via communications network/bus 14, and may have independent communications associated therewith. For example, in the case of a TV or VCR, there may or may not be a networked aspect to the control thereof. Each client computer

1620*a*, 1620*b*, 1620*c*, 1620*d*, 1620*e*, etc. and server computer 1610*a*, 1610*b*, etc. may be equipped with various application program modules or objects 135*a*, 135*b*, 135*c*, etc. and with connections or access to various types of storage elements or objects, across which files or data streams may be stored or to which portion(s) of files or data streams may be downloaded, transmitted or migrated. Any one or more of computers 1610*a*, 1610*b*, 1620*a*, 1620*b*, 1620*c*, 1620*d*, 1620*e*, etc. may be responsible for the maintenance and updating of a database 1630 or other storage element, such as a database or memory 1630 for storing data processed or saved according to the invention. Thus, the present invention can be utilized in a computer network environment having client computers 1620*a*, 1620*b*, 1620*c*, 1620*d*, 1620*e*, etc. that can access and interact with a computer network/bus 1640 and server computers 1610*a*, 1610*b*, etc. that may interact with client computers 1620*a*, 1620*b*, 1620*c*, 1620*d*, 1620*e*, etc. and other like devices, and databases 1630.

Exemplary Computing Device

Figure 17:
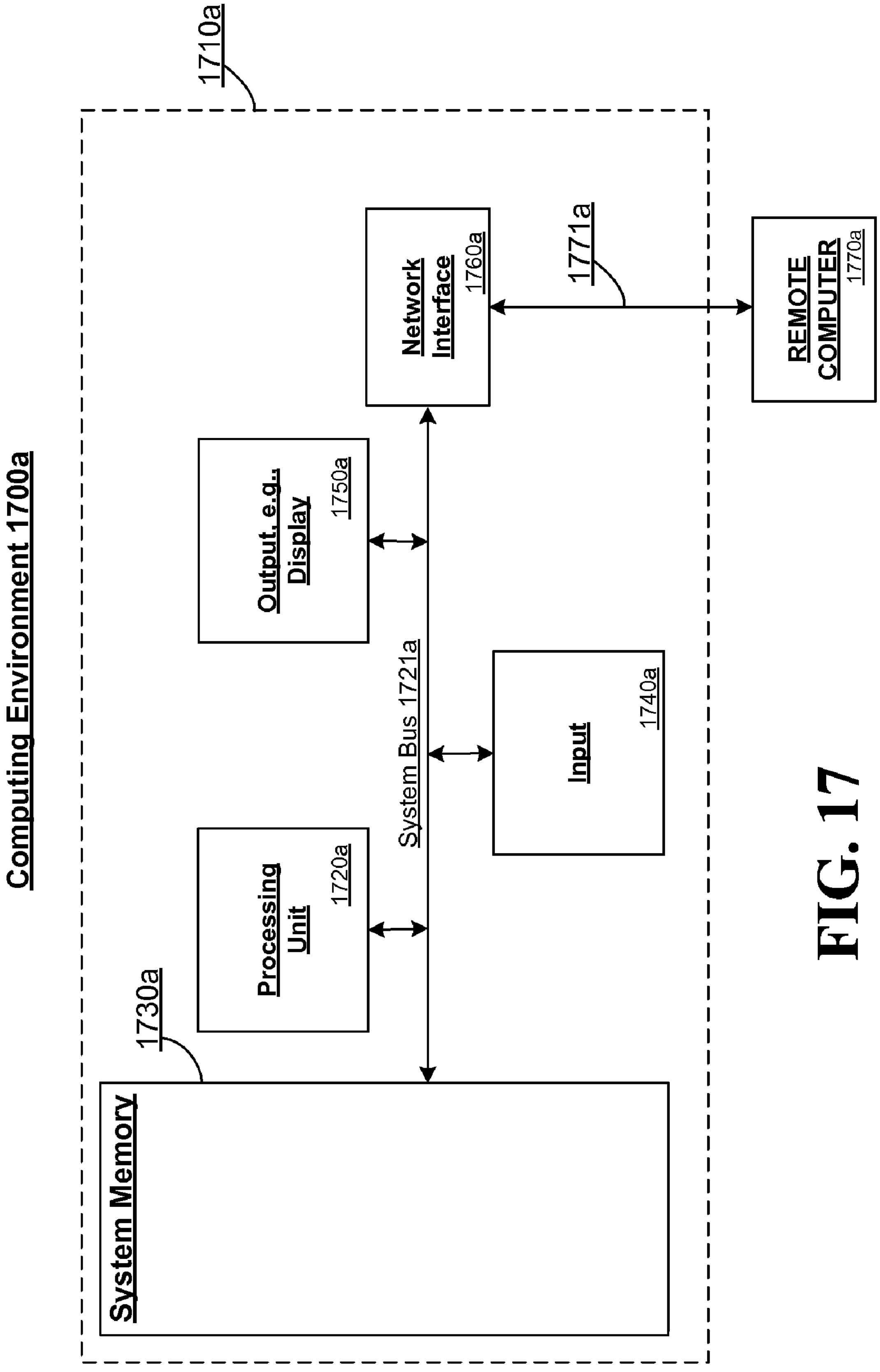
FIG. 17 is a block diagram representing an exemplary non-limiting computing system or operating environment in which the present invention may be implemented.

As mentioned, the invention applies to any device wherein it may be desirable to perform model based testing. It should be understood, therefore, that handheld, portable and other computing devices and computing objects of all kinds are contemplated for use in connection with the present invention, i.e., anywhere that a device may have software to test or otherwise receive, process or store data. Accordingly, the below general purpose remote computer described below in FIG. 17 is but one example, and the present invention may be implemented with any client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance.

Although not required, the invention can partly be implemented via an operating system, for use by a developer of services for a device or object, and/or included within application software that operates in connection with the component(s) of the invention. Software may be described in the general context of computer-executable instructions, such as program modules, being executed by one or more computers, such as client workstations, servers or other devices. Those skilled in the art will appreciate that the invention may be practiced with other computer system configurations and protocols.

FIG. 17 thus illustrates an example of a suitable computing system environment 1700*a* in which the invention may be implemented, although as made clear above, the computing system environment 1700*a* is only one example of a suitable computing environment for a media device and is not intended to suggest any limitation as to the scope of use or functionality of the invention. Neither should the computing environment 1700*a* be interpreted as having any dependency or requirement relating to any one or combination of components illustrated in the exemplary operating environment 1700*a*.

With reference to FIG. 17, an exemplary remote device for implementing the invention includes a general purpose computing device in the form of a computer 1710*a*. Components of computer 1710*a* may include, but are not limited to, a processing unit 1720*a*, a system memory 1730*a*, and a system bus 1721*a* that couples various system components including the system memory to the processing unit 1720*a*. The system bus 1721*a* may be any of several types of bus structures including a memory bus or memory controller, a peripheral bus, and a local bus using any of a variety of bus architectures.

Computer 1710*a* typically includes a variety of computer readable media. Computer readable media can be any available media that can be accessed by computer 1710*a*. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1710*a*. Communication media typically embodies computer readable instructions, data structures, program modules or other data in a modulated data signal such as a carrier wave or other transport mechanism and includes any information delivery media.

The system memory 1730*a* may include computer storage media in the form of volatile and/or nonvolatile memory such as read only memory (ROM) and/or random access memory (RAM). A basic input/output system (BIOS), containing the basic routines that help to transfer information between elements within computer 1710*a*, such as during start-up, may be stored in memory 1730*a*. Memory 1730*a* typically also contains data and/or program modules that are immediately accessible to and/or presently being operated on by processing unit 1720*a*. By way of example, and not limitation, memory 1730*a* may also include an operating system, application programs, other program modules, and program data.

The computer 1710*a* may also include other removable/non-removable, volatile/nonvolatile computer storage media. For example, computer 1710*a* could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive is typically connected to the system bus 1721*a* through a non-removable memory interface such as an interface, and a magnetic disk drive or optical disk drive is typically connected to the system bus 1721*a* by a removable memory interface, such as an interface.

A user may enter commands and information into the computer 1710*a* through input devices such as a keyboard and pointing device, commonly referred to as a mouse, trackball or touch pad. Other input devices may include a microphone, joystick, game pad, satellite dish, scanner, or the like. These and other input devices are often connected to the processing unit 1720*a* through user input 1740*a* and associated interface (s) that are coupled to the system bus 1721*a*, but may be connected by other interface and bus structures, such as a parallel port, game port or a universal serial bus (USB). A graphics subsystem may also be connected to the system bus 1721*a*. A monitor or other type of display device is also connected to the system bus 1721*a* via an interface, such as output interface 1750*a*, which may in turn communicate with video memory. In addition to a monitor, computers may also include other peripheral output devices such as speakers and a printer, which may be connected through output interface 1750*a*.

The computer 1710*a* may operate in a networked or distributed environment using logical connections to one or more other remote computers, such as remote computer 1770*a*, which may in turn have media capabilities different from device 1710*a*. The remote computer 1770*a* may be a personal computer, a server, a router, a network PC, a peer device or other common network node, or any other remote media consumption or transmission device, and may include any or all of the elements described above relative to the computer 1710*a*. The logical connections depicted in FIG. 17 include a network 1771*a*, such local area network (LAN) or a wide area network (WAN), but may also include other networks/buses. Such networking environments are commonplace in homes, offices, enterprise-wide computer networks, intranets and the Internet.

When used in a LAN networking environment, the computer 1710*a* is connected to the LAN 1771*a* through a network interface or adapter. When used in a WAN networking environment, the computer 1710*a* typically includes a communications component, such as a modem, or other means for establishing communications over the WAN, such as the Internet. A communications component, such as a modem, which may be internal or external, may be connected to the system bus 1721*a* via the user input interface of input 1740*a*, or other appropriate mechanism. In a networked environment, program modules depicted relative to the computer 1710*a*, or portions thereof, may be stored in a remote memory storage device. It will be appreciated that the network connections shown and described are exemplary and other means of establishing a communications link between the computers may be used.

Exemplary Distributed Computing Architectures

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT's® managed code platform, i.e., .NET, includes servers, building-block services, such as Web-based data storage and downloadable device software. Generally speaking, the .NET platform provides (1) the ability to make the entire range of computing devices work together and to have user information automatically updated and synchronized on all of them, (2) increased interactive capability for Web pages, enabled by greater use of XML rather than HTML, (3) online services that feature customized access and delivery of products and services to the user from a central starting point for the management of various applications, such as e-mail, for example, or software, such as Office .NET, (4) centralized data storage, which increases efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform and language integration features as well.

While some exemplary embodiments herein are described in connection with software, such as an application programming interface (API), residing on a computing device, one or more portions of the invention may also be implemented via an operating system, or a "middle man" object, a control object, hardware, firmware, intermediate language instructions or objects, etc., such that the methods for model based testing framework in accordance with the invention may be included in, supported in or accessed via all of the languages and services enabled by managed code, such as .NET code, and in other distributed computing frameworks as well.

There are multiple ways of implementing the present invention, e.g., an appropriate API, tool kit, driver code, operating system, control, standalone or downloadable software object, etc. which enables applications and services to use the systems and methods for model based testing of the invention. The invention contemplates the use of the invention from the standpoint of an API (or other software object), as well as from a software or hardware object that receives a downloaded program in accordance with the invention. Thus, various implementations of the invention described herein may have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned above, while exemplary embodiments of the present invention have been described in connection with various computing devices and network architectures, the underlying concepts may be applied to any computing device or system in which it is desirable to perform model based testing. For instance, the model based testing framework of the invention may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. While exemplary programming languages, names and examples are chosen herein as representative of various choices, these languages, names and examples are not intended to be limiting. One of ordinary skill in the art will appreciate that there are numerous ways of providing object code and nomenclature that achieves the same, similar or equivalent functionality achieved by the various embodiments of the invention.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the model based testing framework of the present invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") where used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally, it is known that a carrier wave can be employed to carry computer-readable electronic data such as those used in transmitting and receiving electronic mail or in accessing a network such as the Internet or a local area network (LAN).

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter will be better appreciated with reference to the flowcharts of FIGS. 10A, 10B, 10C and 10D. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fu8y logic, data fusion engines, classifiers . . . ). Such components, inter alia, can automate certain mechanisms or processes performed thereby to make portions of the systems and methods more adaptive as well as efficient and intelligent.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate.

While exemplary embodiments refer to utilizing the present invention in the context of particular programming language constructs, the invention is not so limited, but rather may be implemented in any language to provide methods for model based testing in accordance with the invention. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method for generating a model of at least one portion of a software process in a computer system, comprising:

employing a processor to execute computer executable instructions stored on a computer readable storage medium to implement at least the following acts:

receiving program code represented in a programming language corresponding to at least one portion of the software process;

annotating a copy of the program code with a description, wherein the description describes at least one model represented by the at least one portion of the software process;

generating the at least one model based on the description annotated onto the copy of the program code;

testing the at least one portion of the software process by performing a test on the at least one model; and influencing the at least one model during said testing.

2. The method of claim 1, wherein said annotating includes annotating the copy of the program code with a description that specifies at least one weight of a particular portion of the at least one model.

3. The method of claim 1, wherein said influencing includes modifying the at least one model during the testing.

4. The method of claim 1, further comprising:

performing a custom test on at least one other portion of the software process, different than the at least one portion, the custom test designed to test an execution of the at least one other portion.

5. The method of claim 1, further comprising accessing the at least one model during the testing.

6. The method of claim 1, wherein the description identifies at least one method called by the at least one portion of the software process.

7. The method of claim 6, wherein the description identifies at least one condition for which the at least one method can be called by the at least one portion of the software process.

8. A computer-readable storage medium for testing software processes in a computer system, including:

computer-readable instructions, the computer-readable instructions including instructions that when executed by at least one processor cause the at least one processor to perform the following acts:

interfacing with a memory component that stores at least one portion of a software process as at least one model;

retrieving the at least one model from the memory component;

performing at least one test function on the at least one model, wherein the at least one test function is performed on the at least one model according to at least one dynamic influence, and wherein the at least one dynamic influence dynamically alters the at least one model at run-time; and enabling a reproduction of a specified test sequence of the at least one test function during run-time.

9. The computer-readable storage medium of claim 8, wherein the at least one dynamic influence includes at least one of a first change or a second change, wherein the first change corresponds to a change in a rule or a method of the at least one model, and wherein the second change corresponds to a change to a property of an attribute of the at least one model.

10. The computer-readable storage medium of claim 8, wherein the at least one dynamic influence includes a run-time modification that adds to the at least one model and wherein the at least one test function is performed on the at least one model including the modification.

11. The computer-readable storage medium of claim 8, wherein the at least one test function is performed on the at least one model according to at least one weight assigned to at least one state of the at least one model.

12. The computer-readable storage medium of claim 8, wherein at least one portion of the at least one model is disabled when performing the at least one test function on the at least one model.

13. The computer-readable storage medium of claim 8, wherein the at least one test function is performed on the at least one model for a first portion of the software process, and wherein a custom test function not based on the at least one model is performed on a second portion of the software process, different from the first portion of the software process.

14. The computer-readable storage medium of claim 8, wherein the dynamic influence is provided by a user.

15. The computer-readable storage medium of claim 14, further comprising computer-readable instructions for causing the at least one processor to temporarily stop performing the at least one test function while the dynamic influence is provided by the user.

16. A system configured to test software processes in a computer system, comprising:

a memory configured to store at least one model representing a first portion of a software process;

a test execution component configured to execute a test of the software process that tests the first portion by performing a first test on the at least one model and that tests a second portion of the software process, different from the first portion, according to a custom test different from the first test based on the at least one model, and wherein the test execution component is configured to receive an input identifying a first set of parts of the software process and a second set of parts of the software process, the first set of parts facilitate performing the first test and is included in the first portion, the second set of parts facilitate performing the custom test and is included in the second portion.

17. The system of claim 16, wherein the test execution component is configured to perform the first test of the at least one model, and then halt performing the first test of the at least one model when instructed.

* * * * *